United States Patent
Menabde

(10) Patent No.: US 8,082,167 B2
(45) Date of Patent: Dec. 20, 2011

(54) METHOD, APPARATUS AND COMPUTER PROGRAM FOR SCHEDULING THE EXTRACTION OF A RESOURCE AND FOR DETERMINING THE NET PRESENT VALUE OF AN EXTRACTION SCHEDULE

(75) Inventor: Merab Menabde, Cheltenham (AU)

(73) Assignee: BHP Billiton Innovation Pty Ltd. (AU)

( * ) Notice: Subject to any disclaimer, the term of this patent is extended or adjusted under 35 U.S.C. 154(b) by 1328 days.

(21) Appl. No.: 11/610,617

(22) Filed: Dec. 14, 2006

(65) Prior Publication Data

US 2007/0185750 A1  Aug. 9, 2007

(30) Foreign Application Priority Data

Jun. 21, 2004 (AU) ............................... 2004903360
Mar. 8, 2005 (AU) ............................... 2005901100

(51) Int. Cl.
*G06F 9/44* (2006.01)
(52) U.S. Cl. ........................................ 705/7.11; 705/7.12
(58) Field of Classification Search ........................ None
See application file for complete search history.

(56) References Cited

U.S. PATENT DOCUMENTS

| | | | | |
|---|---|---|---|---|
| 3,692,364 A | * | 9/1972 | Henriksson et al. | 299/18 |
| 4,103,972 A | * | 8/1978 | Kochanowsky | 299/18 |
| 5,524,077 A | * | 6/1996 | Faaland et al. | 705/8 |
| 6,122,621 A | * | 9/2000 | Shimada | 705/7.22 |
| 6,128,540 A | * | 10/2000 | Van Der Vegt et al. | 700/36 |
| 6,278,901 B1 | * | 8/2001 | Winner et al. | 700/99 |
| 7,519,515 B2 | * | 4/2009 | Froyland et al. | 703/1 |
| 7,853,439 B2 | * | 12/2010 | Menabde et al. | 703/2 |
| 7,925,474 B2 | * | 4/2011 | Froyland et al. | 703/1 |
| 7,957,941 B2 | * | 6/2011 | Froyland et al. | 703/1 |
| 2002/0120480 A1 | * | 8/2002 | Kroeger | 705/7 |
| 2006/0190219 A1 | * | 8/2006 | Froyland et al. | 703/1 |

(Continued)

FOREIGN PATENT DOCUMENTS

RU  2004803 C  12/1993

(Continued)

OTHER PUBLICATIONS

Caccetta L, Hill SP. An application of branch and cut to open pit mine scheduling. Journal of Global Optimization 2003; 27:349-65.*

(Continued)

*Primary Examiner* — Johnna Loftis
*Assistant Examiner* — Brett Feeney
(74) *Attorney, Agent, or Firm* — Brinks Hofer Gilson & Lione; G. Peter Nichols

(57) ABSTRACT

The scheduling of extraction of a resource within a mine is disclosed which comprises obtaining drill hole grade data relating to the resource and creating a plurality of different block models, with each block in each model having a resource grade and each of the block models honoring the drill hole grade data. An extraction schedule is determined based on a cut-off grade policy to increase expected net present value of the mine. The cut-off grade policy can be a variable cut-off grade and the scheduling using the variable cut-off grade is converted from a non-linear representation to a linear representation and a mixed integer programming formulation is used for simultaneous optimization of the extraction schedule and the cut-off grade.

69 Claims, 6 Drawing Sheets

U.S. PATENT DOCUMENTS

2006/0265342 A1* 11/2006 Froyland et al. .............. 705/500
2008/0046272 A1* 2/2008 Menabde et al. .................. 705/1
2009/0306942 A1* 12/2009 Froyland et al. .................. 703/1

FOREIGN PATENT DOCUMENTS

RU          2204719 C     5/2003
WO    WO 2004/033854 A    4/2004

OTHER PUBLICATIONS

Hochbaum et al, "Performance Analysis and Best Implementations of Old and New Algorithms for the Open-Pit Mining Problem", Department of Industrial Engineering and Operations Research, University of California, Berkley, Jan. 16, 1998.*
Godoy and Dimitrakopoulos (2004). Managing Risk and Waste Mining in Long-Term Production Scheduling of Open-Pit Mines. Society for Mining, Mettalurgy, and Exploration. 316: 43-50.*
Gershon ME (1987). Heuristic Approaches for Mine Planning and Production Scheduling. International Journal of Mining and Geological Engineering. 5: 1-13.*
Gershon ME (1983). Optimal mine production scheduling evaluation of large scale mathematical programming approaches. International Journal of Mining Engineering. 1: 315-329.*
Hack DR (2002). Comparison of Commercial Mine Planning Packages Available to the Aggregate Industry. GeoNumerics, Inc. pp. 1-9.*
Hochbaum DS and ChenSource A (2000). Performance Analysis and Best Implementations of Old and New Algorithms for the Open-Pit Mining Problem. Operations Research. 48 (6): 894-914.*
ILOG CPLEX 9.0 (2003). ILOG. pp. 1-564.*
Ramazan S and Dimitrakopoulos R. (2004). Stochastic Optimisation of Long-Term Production Scheduling for Open Pit Mines With a New Integer Programming Formulation. Orebody Modelling and Strategic Mine Planning Spectrum Series 14: 359-365. *Available on Google Scholar. Do not have permissions to attach document.*
Kanevski M, Parkin R, Poznukhov A, Timonin V, Maignan M, Yatsalo B and Canu S (2004). Environmental Data Mining and Modelling Based on Machine Learning Algorithms and Geostatistics. Environmental Sciences and Artificial Intelligence. 19 (9): 845-855.*
Knowles TW (1999). Optimization Models for Mine Planning. Computers & Industrial Engineering 37: 469-472.*
Ramazan S and Dimitrakopoulos R. (2004). Recent applications of operations research in open pit mining. Transactions of the Society for Mining, Metallurgy and Exploration 2004; 316:73-8.*
Ramazan S and Dimitrakopoulos R. (2003). Production Scheduling Optimisation in a Nickel Laterite Deposit: MIP and LP Applications and Infeasibility in the Presence of Orebody Variability. Mining Planning and Equipment Selection. April, pp. 1-5.*
Tvedt J (2001). Ownership Structure and Optimal Field Development. DnB Markets and Norwegian School of Economics and Business Administration. 1-14.*
Blending and Schedule Optimization with MinMAX Scheduler. MineMAX MineMax Ltd. (2004). Slides 1-36.*
MineMAX Scheduler screen shots web.archive.org (Jun. 4, 2004). pp. 1-8.*
Whittle Strategic Mine Planning. Brochure Apr. 3, 2004.*
MineMAX Scheduler: Mine Scheduling Optimization (2000). White Paper. MineMax. pp. 1-13.*
Bezdek, J.C. et al., "Convergence Theory for Fuzzy c-Means: Counterexamples and Repairs", *IEEE Transactions on Systems, Man and Cybernetics*, vol. SMC-17, No. 5, pp. 873-877, Sep./Oct. 1987.
Brealey, S.C. et al., "Opencast Mining", *The Mining Engineer, I.M.E.(UK)*, No. 99, pp. 147-163, Dec. 1968.
Caccetta, L. et al., "An Application of Branch and Cut to Open Pit Mine Scheduling", http://rutcor.rutgers.edu/~do99/EA/SHill.doc, pp. 1-24, 1999.
International Search Report for corresponding PCT Patent Application U.S. Appl. No. PCT/AU2005/000761 dated Jul. 8, 2005.
Kaas, L.M. et al., "Computer Techniques for Production Scheduling and Blending of Taconite", *Proceedings of the 26th Annual Mining Symposium, University of Minnesota*, pp. 135-144, Jan. 1965.
Lerchs, H. et al. "Optimum Design of Open-Pit Mines", *Transactions, C.I.M*, vol. LXVII, pp. 17-24, 1965.
Pana, M.T., "The Simulation Approach to Open-Pit Design", *Transactions of the Short Course and Symposium on Computers and Computer Applications in Mining and Exploration, University of Arizona*, pp. 1-23, Mar. 1965.
Underwood, R. et al, "A Mathematical Programming Viewpoint for Solving the Ultimate Pit Problem", *EJOR*, pp. 1-18, 1998.
Wharton, C. et al., "The Effect of Minimum Mining Width on NPV", *Proceedings of the 1997 Whittle Conference, "Optimizing with Whittle"*, Perth, WA, pp. 173-178, Apr. 1997.

* cited by examiner

METHOD, APPARATUS AND COMPUTER PROGRAM FOR SCHEDULING THE EXTRACTION OF A RESOURCE AND FOR DETERMINING THE NET PRESENT VALUE OF AN EXTRACTION SCHEDULE

This application claims priority to PCT application PCT/AU2005/000761 published in English on Dec. 29, 2005 as WO 2005/124104 and to Australian application nos. 2004903360 filed Jun. 21, 2004, and 2005901100 filed Mar. 8, 2005, the entire contents of each are incorporated herein by reference.

FIELD OF THE INVENTION

The present invention relates to a method and apparatus for scheduling the extraction of a resource and for determining the net present value of an extraction schedule. Typically the resource is an ore body which is to be mined in an open cut mine.

BACKGROUND OF THE INVENTION

Typically, the mining of a resource may take place over a period of 15-30 years before the mine is exhausted to a position where further mining is not economic.

The process of mine development and design and long-term scheduling is based on spatial interpretation of drillhole data. Thus, drillholes are drilled over the region to be mined and data relating to the grade of the resource is obtained. The drillholes are generally drilled a reasonable distance apart because this procedure is relatively expensive. A block model of the region to be mined is created and typically, the block model may contain between 50,000 to 1,000,000 blocks which are to be scheduled for mining over the period of 15-30 years. A block is that material enclosed by a rectangular prism in the ground and may contain air to a volumetric percentage strictly less than 100%. A block model is a collection of non-intersecting blocks that are usually, but not necessarily, spatially connected and which contain no less than all material considered to have economic value in a mining enterprise. The objective of the scheduling procedure is to find the block extraction sequence which produces the maximum possible net present value (NPV) and obeys a number of constraints. The constraints include:
(a) geotechnical slope constraints which are modelled by a set of precedence rules constraining the order of extraction of individual blocks;
(b) mining constraints, i.e. total maximum amount of rock which can be mined in one time period (usually 1 year);
(c) processing constraints, i.e. maximum amount or ore which can be processed through a given processing plant in one time period;
(d) and the market constraints, i.e. the maximum amount of metal, which can be sold in one time period;
(e) Any other constraints salient to the practical mining operation including but not restricted to maximum limits in sinking-rate and available ore.

A schedule is a period of extraction for each block and a destination for each block (waste, stockpile or process plant.

The ore body model which is built up from the drillhole data is a deterministic model created by spatial interpretation of the data using some kind of so-called Kriging procedure. This enables each of the blocks in the model to be assigned a resource grade (i.e. the amount of the resource present in the block). The resource grade information is then used to determine the scheduling of the mining operation, and also whether a particular block is sent for processing to extract the resource, sent to waste, or stockpiled for later processing.

Because the drillholes are generally drilled some distance apart, the drillhole data is usually sparse and therefore this introduces inherent errors in the deterministic block model. To some extent, this can be overcome by providing more data by drilling more holes. However, as is explained above, the drilling of the drillholes is expensive and therefore, this is not desirable.

Thus, traditionally open pit mine planning is based on the block model which is built up using some kind of interpolation technique such as the Kriging procedure so that a single model is produced. This single model is assumed to be a fair representation of reality and is used for mine design and optimisation. The design process consists of three main steps:
(a) finding the block extraction sequence which produces the best net present value whilst satisfying geotechnical slope constraints;
(b) designing the practically mineable mine phases (so-called push backs) which are roughly based on the optimal block sequence; and
(c) optimising the mining schedule and cut-off grades.

The cut-off grade (COG) is defined as the threshold such that the blocks with a grade above it are sent to the processing plant and with a grade below it are treated as waste. It can be constant for the whole life of mine, or can be variable, i.e. dependent on the period of extraction.

In practice, the open mine is divided into a number of the mining phases, which are mined bench by bench, each bench being represented by a horizontal layer of blocks within the given mining phase and having the same elevation. A bench within a mining phase is sometimes referred to as a "panel" (one or more layers of blocks). The mining phases can be mined one by one from top to bottom. However, this kind of schedule is usually sub-optimal. Mining several phases simultaneously and applying a variable cut-off grade can produce much better results. There are several commercially available packages which claim to optimise the schedule and cut-off grade using a single block model representation of the resource. However, it is difficult to estimate their effectiveness as the upper theoretical limit on the net present value remains unknown.

The standard optimisation technique widely used in many industrial applications is the linear and integer programming (e.g. Padberg, 2003). However, in order for this program to operate satisfactorily, the problem to be solved needs to be formulated as a linear one.

SUMMARY OF THE INVENTION

A first aspect of the invention is concerned with scheduling the extraction of a resource to improve the net present value.

The invention may therefore be said to reside in a method of scheduling the extraction of a resource within a medium comprising the steps of:
obtaining drillhole grade data relating to the resource contained within the medium;
creating a plurality of different block models, each formed of a plurality of blocks, each block in each model having a resource grade, each of the block models honouring the drillhole grade data; and
scheduling extraction of blocks based on a cut-off grade policy to increase expected net present value having regard to all of the block models.

Thus, by using a plurality of different block models, a much larger number of possible representations of the presence of the resource in the medium are obtained. Each of those representations is equally likely to occur because each honours the drillhole grade data which have been measured. Thus, by using all of those possibilities, a more accurate representation of the actual resource distribution within the medium can be obtained, and therefore a better indication of whether a region of the medium represented by a block should be forwarded to processing. For example, if the cut-off grade of the resource in a particular period is 0.6%, the method is able to see that a particular block may in some realities be below this cutoff grade (in which case it is sent to waste), and in some realities is above this cutoff grade (in which case it is processed). By using all of the models, such as by averaging different block valuations (processed or wasted) from different realities we more accurately model the process in reality. This is because at the time of extraction extra blast-hole data are available to enable determination of a more accurate quantification of the block grade and hence the selectivity option encoded in the use of multiple conditional simulations can be gainfully exploited in calculating both the schedule and undiscounted block valuation and hence ultimately in obtaining a more accurate determination of the net present value of each block. Thus, a schedule is obtained which gives an increased and more accurate net present value, compared to existing techniques, of a mine containing the resource and the medium.

In the preferred embodiment of the invention, the creation of the plurality of different block models is a conditional simulation technique which provides the generation of a plurality of equally probable block model realisations, all of which honour the data and first and second order statistics of the resource represented, respectively, by probability distribution function and variogram.

In one embodiment of the invention, the number of blocks in each of the block models is reduced by aggregating blocks prior to the step of scheduling extraction. Instances of block aggregations are assumed to have homogeneous properties within each grade bin.

A collection of one or more blocks that are members of a particular aggregate where the grade attribute of each block falls within defined upper and lower limits is called a grade bin. Grade bins are used to practically apply cut-off grades, viz: all blocks in grade bins above the cut-off grade are sent to process plant.

In one embodiment of the invention, the cut-off grade is a fixed cut-off grade. However, in the preferred embodiment of the invention, the cut-off grade is a variable cut-off grade.

In the preferred embodiment of the invention, the plurality of block models are used to provide an average of resource grade and block valuations and the average of the resource grade and block valuations is used to produce the scheduled extraction of blocks and the cut-off grade value to increase expected net present value.

In one embodiment of the invention, the scheduled extraction of blocks may be optimised by considering the average valuation produced from the conditional simulations.

However, in the preferred embodiment of the invention, all of the conditional simulations are optimized simultaneously to produce a single extraction schedule with a variable cut-off grade policy, and wherein all the conditional simulations are valued using this schedule and the valuations are averaged to produce the expected net present value, which is substantially better than the one obtained by optimizing the average grade block model.

In the preferred embodiment of the invention, the extraction schedule determines whether resource and medium corresponding to each block is sent for processing, sent to waste or stockpiled for later processing.

In the preferred embodiment, the step of scheduling using a variable cut-off grade is converted from a non-linear representation to a linear representation, and a mixed integer programming formulation is used for simultaneous optimisation of the extraction schedule and the cut-off grade.

Preferably the scheduling is determined by $$\text{Maximise}\left(\frac{1}{N}\sum_{n=1}^{N}\sum_{i=1}^{P}\sum_{j=1}^{G}\sum_{t=1}^{T}V_{ij}^{n}x_{ijt}d^{t}\right) \quad (1)$$

subject to the following constraints:

$$\frac{1}{N}\sum_{n=1}^{N}\sum_{i=1}^{P}\sum_{j=1}^{G}R_{i}^{n}x_{ijt} \leq R_{t}^{0}, \text{ for all } t \quad (2)$$

$$\frac{1}{N}\sum_{n=1}^{N}\sum_{i=1}^{P}\sum_{j=1}^{G}Q_{ij}^{n}x_{ijt} \leq Q_{t}^{0}, \text{ for all } t \quad (3)$$

$$y_{i,t-1} \leq y_{it}, \text{ for all } i \text{ and } t \quad (4)$$

$$\sum_{\tau=1}^{t}\sum_{j=1}^{G}x_{ij\tau} \leq y_{it}, \text{ for all } i \quad (5)$$

$$y_{it} \leq \sum_{j=1}^{G}\sum_{\tau=1}^{T}x_{kj\tau}, \text{ for all } i, t \text{ and } k \subset Si \quad (6)$$

$$\sum_{j=1}^{G}\delta_{jt} = 1, \text{ for all } t \quad (7)$$

$$x_{ijt} \leq \delta_{jt}, \text{ for all } i, j, \text{ and } t \quad (8)$$

wherein;
T is the number of scheduling periods;
N is the number of simulations;
P is the total number of panels;
G is the number of all possible cutoff grades;
$R_i^n$ is the total rock in the panel i in simulations n.
$Q_{ij}^n$ is the total ore in the panel i, simulation n, when mined with the COG j;
$V_{ij}^n$ is the value of the panel i, simulation n, when mined and processed with the COG j;
$R_t^0$ is the maximum mining capacity in period t;
$Q_t^0$ is the maximum processing rate in period t;
$S_i$ is the set of panels that must be removed before starting the panel i;
$d^t$ is the time discount factor;
$x_{ijt}$ is the fraction of the panel i is extracted with the COG j in period t;
$y_{it}$ is a binary variable equal to 1 if the extraction of the panel i has started in periods 1 to t, and equal to 0 otherwise;
$\delta_{jt}$ is a binary variable controlling the selection of the COG applied in period t.

The invention may also be said to reside in an apparatus of scheduling the extraction of a resource within a medium from which drillhole grade data relating to the resource contained within the medium has been obtained comprising:
a processor for creating a plurality of different block models, each formed of a plurality of blocks, each block in each model having a resource grade, each of the block models honouring the drillhole grade data; and
a processor for scheduling extraction of blocks based on a cut-off grade policy to increase expected net present value having regard to all of the block models.

In the preferred embodiment of the invention, the processor is for creating conditional simulations which provides the generation of a plurality of equally probable block model realisations, all of which honour the data and first and second order statistics of the resource represented, respectively, by probability distribution function and variogram.

In one embodiment of the invention, the processor is also for reducing the number of blocks in each of the block models by aggregating blocks prior to the step of scheduling extraction.

In one embodiment of the invention, the cut-off grade is a fixed cut-off grade. However, in the preferred embodiment of the invention, the cut-off grade is a variable cut-off grade.

In the preferred embodiment of the invention, the processor is for providing an average of resource grade and block valuations from the plurality of models, and the average of the resource grade and block valuations is used to produce the scheduled extraction of blocks and the cut-off grade value to increase expected net present value.

In one embodiment of the invention, the processor is for scheduling extraction of blocks optimised by considering the average valuation produced from the conditional simulations.

However, in the preferred embodiment of the invention, all of the conditional simulations are optimized simultaneously to produce a single extraction schedule with a variable cut-off grade policy, and wherein all the conditional simulations are valued using this schedule and the valuations are averaged to produce the expected net present value, which is substantially better than the one obtained by optimizing the average grade block model.

In the preferred embodiment of the invention, the extraction schedule determines whether resource and medium corresponding to each block is sent for processing, sent to waste or stockpiled for later processing.

In the preferred embodiment, the processor is for converting from a non-linear representation to a linear representation when a variable cut-off grade is used, and a mixed integer programming formulation is used for simultaneous optimisation of the extraction schedule and the cut-off grade.

Preferably the scheduling is determined by the processor by $$Maximise\left(\frac{1}{N}\sum_{n=1}^{N}\sum_{i=1}^{P}\sum_{j=1}^{G}\sum_{t=1}^{T}V_{ij}^{n}x_{ijt}d^{t}\right) \quad (1)$$

subject to the following constraints:

$$\frac{1}{N}\sum_{n=1}^{N}\sum_{i=1}^{P}\sum_{j=1}^{G}R_{i}^{n}x_{ijt} \leq R_{t}^{0}, \text{ for all } t \quad (2)$$

$$\frac{1}{N}\sum_{n=1}^{N}\sum_{i=1}^{P}\sum_{j=1}^{G}Q_{ij}^{n}x_{ijt} \leq Q_{t}^{0}, \text{ for all } t \quad (3)$$

$$y_{i,t-1} \leq y_{it}, \text{ for all } i \text{ and } t \quad (4)$$

$$\sum_{\tau=1}^{t}\sum_{j=1}^{G}x_{kj\tau} \leq y_{it}, \text{ for all } i \quad (5)$$

$$y_{it} \leq \sum_{j=1}^{G}\sum_{t=1}^{T}x_{kj\tau}, \text{ for all } i, t \text{ and } k \subset Si \quad (6)$$

-continued $$\sum_{j=1}^{G}\delta_{jt} = 1, \text{ for all } t \quad (7)$$

$$x_{ijt} \leq \delta_{jt}, \text{ for all } i, j, \text{ and } t \quad (8)$$

wherein;

T is the number of scheduling periods;
N is the number of simulations;
P is the total number of panels;
G is the number of all possible cutoff grades;
$R_i^n$ is the total rock in the panel i in simulations n.
$Q_{ij}^n$ is the total ore in the panel i, simulation n, when mined with the COG j;
$V_{ij}^n$ is the value of the panel i, simulation n, when mined and processed with the COG j;
$R_t^0$ is the maximum mining capacity in period t;
$Q_t^0$ is the maximum processing rate in period t;
$S_i$ is the set of panels that must be removed before starting the panel i;
$d^t$ is the time discount factor;
$x_{ijt}$ is the fraction of the panel i is extracted with the COG j in period t;
$y_{it}$ is a binary variable equal to 1 if the extraction of the panel i has started in periods 1 to t, and equal to 0 otherwise;
$\delta_{jt}$ is a binary variable controlling the selection of the COG applied in period t.

The invention may therefore be said to reside in a computer program for scheduling the extraction of a resource within a medium comprising:
code for receiving drillhole grade data relating to the resource contained within the medium;
code for creating a plurality of different block models, each formed of a plurality of blocks, each block in each model having a resource grade, each of the block models honouring the drillhole grade data; and
code for scheduling extraction of blocks based on a cut-off grade policy to increase expected net present value having regard to all of the block models.

In the preferred embodiment of the invention, the code for creation of the plurality of different block models is code for performing a conditional simulation technique which provides the generation of a plurality of equally probable block model realisations, all of which honour the data and first and second order statistics of the resource represented, respectively, by probability distribution function and variogram.

In one embodiment of the invention, the program further comprises code for reducing the number of blocks in each of the block models by aggregating blocks prior to the step of scheduling extraction.

In one embodiment of the invention, the cut-off grade is a fixed cut-off grade. However, in the preferred embodiment of the invention, the cut-off grade is a variable cut-off grade.

In the preferred embodiment of the invention, the code for scheduling includes code to provide an average of resource grade and block valuations and the average of the resource grade and block valuations is used to produce the scheduled extraction of blocks and the cut-off grade value to increase expected net present value.

In one embodiment of the invention, the code for scheduling further comprises code for optimizing extraction by considering the average valuation produced from the conditional simulations.

However, in the preferred embodiment of the invention, the code for scheduling further comprises code for using all of the conditional simulations to optimize simultaneously to produce a single extraction schedule with a variable cut-off grade policy, and wherein all the conditional simulations are valued using this schedule and the valuations are averaged to produce the expected net present value, which is substantially better than the one obtained by optimizing the average grade block model.

In the preferred embodiment of the invention, the extraction schedule determines whether resource and medium corresponding to each block is sent for processing, sent to waste or stockpiled for later processing.

In the preferred embodiment, the code for scheduling using a variable cut-off grade converts from a non-linear representation to a linear representation, and further comprises a mixed integer programming formulation is used for simultaneous optimisation of the extraction schedule and the cut-off grade.

Preferably the code for scheduling is to $$Maximise\left(\frac{1}{N}\sum_{n=1}^{N}\sum_{i=1}^{P}\sum_{j=1}^{G}\sum_{t=1}^{T}V_{ij}^{n}x_{ijt}d^{t}\right) \quad (1)$$

subject to the following constraints:

$$\frac{1}{N}\sum_{n=1}^{N}\sum_{i=1}^{P}\sum_{j=1}^{G}R_{i}^{n}x_{ijt} \leq R_{t}^{0}, \text{ for all } t \quad (2)$$

$$\frac{1}{N}\sum_{n=1}^{N}\sum_{i=1}^{P}\sum_{j=1}^{G}Q_{i}^{n}x_{ijt} \leq Q_{t}^{0}, \text{ for all } t \quad (3)$$

$$y_{i,t-1} \leq y_{it}, \text{ for all } i \text{ and } t \quad (4)$$

$$\sum_{\tau=1}^{t}\sum_{j=1}^{G}x_{kj\tau} \leq y_{it}, \text{ for all } i \quad (5)$$

$$y_{it} \leq \sum_{j=1}^{G}\sum_{\tau=1}^{T}x_{kj\tau}, \text{ for all } i, t \text{ and } k \subset Si \quad (6)$$

$$\sum_{j=1}^{G}\delta_{jt} = 1, \text{ for all } t \quad (7)$$

$$x_{ijt} \leq \delta_{jt}, \text{ for all } i, j, \text{ and } t \quad (8)$$

wherein;
T is the number of scheduling periods;
N is the number of simulations;
P is the total number of panels;
G is the number of all possible cutoff grades;
$R_i^n$ is the total rock in the panel i in simulations n.
$Q_{ij}^n$ is the total ore in the panel i, simulation n, when mined with the COG j;
$V_{ij}^n$ is the value of the panel i, simulation n, when mined and processed with the COG j;
$R_t^0$ is the maximum mining capacity in period t;
$Q_t^0$ is the maximum processing rate in period t;
$S_i$ is the set of panels that must be removed before starting the panel i;
$d^t$ is the time discount factor;
$x_{ijt}$ is the fraction of the panel i is extracted with the COG j in period t;
$y_{it}$ is a binary variable equal to 1 if the extraction of the panel i has started in periods 1 to t, and equal to 0 otherwise;

$\delta_{jt}$ is a binary variable controlling the selection of the COG applied in period t.

The invention may therefore be said to reside in a method of mining a mine comprising a resource within a medium, the method comprising:

removing medium and resource from the mine using an extraction schedule created by the following steps;

obtaining drillhole grade data relating to the resource contained within the medium;

creating a plurality of different block models, each formed of a plurality of blocks, each block in each model having a resource grade, each of the block models honouring the drillhole grade data; and scheduling extraction of blocks based on a cut-off grade policy to increase expected net present value having regard to all of the block models.

In the preferred embodiment of the invention, the creation of the plurality of different block models is a conditional simulation technique which provides the generation of a plurality of equally probable block model realisations, all of which honour the data and first and second order statistics of the resource represented, respectively, by probability distribution function and variogram.

In one embodiment of the invention, the number of blocks in each of the block models is reduced by aggregating blocks prior to the step of scheduling extraction. Instances of block aggregations are assumed to have homogeneous properties within each grade bin.

In one embodiment of the invention, the cut-off grade is a fixed cut-off grade. However, in the preferred embodiment of the invention, the cut-off grade is a variable cut-off grade.

In the preferred embodiment of the invention, the plurality of block models are used to provide an average of resource grade and block valuations and the average of the resource grade and block valuations is used to produce the scheduled extraction of blocks and the cut-off grade value to increase expected net present value.

In one embodiment of the invention, the scheduled extraction of blocks may be optimised by considering the average valuation produced from the conditional simulations.

However, in the preferred embodiment of the invention, all of the conditional simulations are optimized simultaneously to produce a single extraction schedule with a variable cut-off grade policy, and wherein all the conditional simulations are valued using this schedule and the valuations are averaged to produce the expected net present value, which is substantially better than the one obtained by optimizing the average grade block model.

In the preferred embodiment of the invention, the extraction schedule determines whether resource and medium corresponding to each block is sent for processing, sent to waste or stockpiled for later processing.

In the preferred embodiment, the step of scheduling using a variable cut-off grade is converted from a non-linear representation to a linear representation, and a mixed integer programming formulation is used for simultaneous optimisation of the extraction schedule and the cut-off grade.

Preferably the scheduling is determined by $$Maximise\left(\frac{1}{N}\sum_{n=1}^{N}\sum_{i=1}^{P}\sum_{j=1}^{G}\sum_{t=1}^{T}V_{ij}^{n}x_{ijt}d^{t}\right) \quad (1)$$

subject to the following constraints:

$$\frac{1}{N}\sum_{n=1}^{N}\sum_{i=1}^{P}\sum_{j=1}^{G} R_i^n x_{ijt} \leq R_t^0, \text{ for all } t \quad (2)$$

$$\frac{1}{N}\sum_{n=1}^{N}\sum_{i=1}^{P}\sum_{j=1}^{G} Q_{ij}^n x_{ijt} \leq Q_t^0, \text{ for all } t \quad (3)$$

$$y_{i,t-1} \leq y_{it}, \text{ for all } i \text{ and } t \quad (4)$$

$$\sum_{\tau=1}^{t}\sum_{j=1}^{G} x_{ij\tau} \leq y_{it}, \text{ for all } i \quad (5)$$

$$y_{it} \leq \sum_{j=1}^{G}\sum_{t=1}^{T} x_{kj\tau}, \text{ for all } i, t \text{ and } k \subset Si \quad (6)$$

$$\sum_{j=1}^{G} \delta_{jt} = 1, \text{ for all } t \quad (7)$$

$$x_{ijt} \leq \delta_{jt}, \text{ for all } i, j, \text{ and } t \quad (8)$$

wherein;
T is the number of scheduling periods;
N is the number of simulations;
P is the total number of panels;
G is the number of all possible cutoff grades;
$R_i^n$ is the total rock in the panel i in simulations n.
$Q_{ij}^n$ is the total ore in the panel i, simulation n, when mined with the COG j;
$V_{ij}^n$ is the value of the panel i, simulation n, when mined and processed with the COG j;
$R_t^0$ is the maximum mining capacity in period t;
$Q_t^0$ is the maximum processing rate in period t;
$S_i$ is the set of panels that must be removed before starting the panel i;
$d^t$ is the time discount factor;
$x_{ijt}$ is the fraction of the panel i is extracted with the COG j in period t;
$y_{it}$ is a binary variable equal to 1 if the extraction of the panel i has started in periods 1 to t, and equal to 0 otherwise;
$\delta_{jt}$ is a binary variable controlling the selection of the COG applied in period t.

The invention may therefore be said to reside in a method of determining the net present value of a mine comprising a resource within a medium, the method comprising the steps of:
obtaining drillhole grade data relating to the resource contained within the medium;
creating a plurality of different block models, each formed of a plurality of blocks, each block in each model having a resource grade, each of the block models honouring the drillhole grade data; and
scheduling extraction of blocks based on a cut-off grade policy to provide the net present value having regard to all of the block models.

In the preferred embodiment of the invention, the creation of the plurality of different block models is a conditional simulation technique which provides the generation of a plurality of equally probable block model realisations, all of which honour the data and first and second order statistics of the resource represented, respectively, by probability distribution function and variogram.

In one embodiment of the invention, the number of blocks in each of the block models is reduced by aggregating blocks prior to the step of scheduling extraction.

In one embodiment of the invention, the cut-off grade is a fixed cut-off grade. However, in the preferred embodiment of the invention, the cut-off grade is a variable cut-off grade.

In the preferred embodiment of the invention, the plurality of block models are used to provide an average of resource grade and block valuations and the average of the resource grade and block valuations is used to produce the scheduled extraction of blocks and the cut-off grade value to increase expected net present value.

In one embodiment of the invention, the scheduled extraction of blocks may be optimised by considering the average valuation produced from the conditional simulations.

However, in the preferred embodiment of the invention, all of the conditional simulations are optimized simultaneously to produce a single extraction schedule with a variable cut-off grade policy, and wherein all the conditional simulations are valued using this schedule and the valuations are averaged to produce the expected net present value, which is substantially better than the one obtained by optimizing the average grade block model.

In the preferred embodiment of the invention, the extraction schedule determines whether resource and medium corresponding to each block is sent for processing, sent to waste or stockpiled for later processing.

In the preferred embodiment, the step of scheduling using a variable cut-off grade is converted from a non-linear representation to a linear representation, and a mixed integer programming formulation is used for simultaneous optimisation of the extraction schedule and the cut-off grade.

Preferably the scheduling is determined by $$\text{Maximise}\left(\frac{1}{N}\sum_{n=1}^{N}\sum_{i=1}^{P}\sum_{j=1}^{G}\sum_{t=1}^{T} V_{ij}^n x_{ijt} d^t\right) \quad (1)$$

subject to the following constraints:

$$\frac{1}{N}\sum_{n=1}^{N}\sum_{i=1}^{P}\sum_{j=1}^{G} R_i^n x_{ijt} \leq R_t^0, \text{ for all } t \quad (2)$$

$$\frac{1}{N}\sum_{n=1}^{N}\sum_{i=1}^{P}\sum_{j=1}^{G} Q_{ij}^n x_{ijt} \leq Q_t^0, \text{ for all } t \quad (3)$$

$$y_{i,t-1} \leq y_{it}, \text{ for all } i \text{ and } t \quad (4)$$

$$\sum_{\tau=1}^{t}\sum_{j=1}^{G} x_{ij\tau} \leq y_{it}, \text{ for all } i \quad (5)$$

$$y_{it} \leq \sum_{j=1}^{G}\sum_{t=1}^{T} x_{kj\tau}, \text{ for all } i, t \text{ and } k \subset Si \quad (6)$$

$$\sum_{j=1}^{G} \delta_{jt} = 1, \text{ for all } t \quad (7)$$

$$x_{ijt} \leq \delta_{jt}, \text{ for all } i, j, \text{ and } t \quad (8)$$

wherein;
T is the number of scheduling periods;
N is the number of simulations;
P is the total number of panels;
G is the number of all possible cutoff grades;
$R_i^n$ is the total rock in the panel i in simulations n.

$Q_{ij}^n$ is the total ore in the panel i, simulation n, when mined with the COG j;
$V_{ij}^n$ is the value of the panel i, simulation n, when mined and processed with the COG j;
$R_t^0$ is the maximum mining capacity in period t;
$Q_t^0$ is the maximum processing rate in period t;
$S_i$ is the set of panels that must be removed before starting the panel i;
$d^t$ is the time discount factor;
$x_{ijt}$ is the fraction of the panel i is extracted with the COG j in period t;
$y_{it}$ is a binary variable equal to 1 if the extraction of the panel i has started in periods 1 to t, and equal to 0 otherwise;
$\delta_{jt}$ is a binary variable controlling the selection of the COG applied in period t.

A further aspect of the invention concerns reducing the difficulty of processing information in order to provide extraction schedules and net present value estimations.

According to a further aspect, the invention may be said to reside in a method for scheduling the extraction of a resource contained within a medium, comprising the steps of:
  obtaining drillhole grade data relating to the resource contained within the medium;
  creating a block model with each block in the model having a resource grade;
  scheduling extraction of blocks based on a variable cut-off grade value to increase expected net present value, the variable cut-off grade being represented by a non-linear function; and
  converting the non-linear representation to a linear representation and using a mixed integer programming formulation for a simultaneous optimisation of an extraction sequence provided by the scheduled extraction and cut-off grade policy.

Thus, the method according to this aspect of the invention simplifies processing because of the linearisation of the problem and also therefore enables a variable cut-off grade to be used in the optimisation instead of a fixed cut-off grade value.

In the preferred embodiment of the invention, the non-linear function is converted to a plurality of linear values by producing a plurality of step values relating to the non-linear function, and selecting one of the values to provide the cut-off grade decision by the mixed integer programming function.

In one embodiment of the invention, the block model is a deterministic model built by spatial interpretation of the data using a Kriging procedure. Thus, in this embodiment, only a single model is provided.

However, in the preferred embodiment of the invention, the block model is a conditional simulation producing a plurality of different block models providing a number of equally probably realisations of block models honouring the drillhole data and first and second order statistics of the resource distributed in the medium represented, respectively, by probability distribution and variogram.

In one embodiment of the invention, the number of blocks in each of the block models is reduced by aggregating blocks prior to the step of scheduling extraction.

In the preferred embodiment of the invention, the plurality of block models are used to provide an average of resource grade valuations and the average of the resource grade valuations is used to produce the scheduled extraction of blocks and the cut-off grade value to increase expected net present value.

In one embodiment of the invention, the scheduled extraction of blocks may be optimised by considering the average valuation produced from the conditional simulations.

However, in the preferred embodiment of the invention, all of the conditional simulations are optimised to produce a plurality of extraction schedules, each having valuations and the valuations are averaged to produce the net present value, and the extraction schedule comprises the extraction schedule which is closest to that giving the net present value.

In the preferred embodiment of the invention, the extraction schedule determines whether resource and medium corresponding to each block is sent for processing, sent to waste or stockpiled for later processing.

Preferably the scheduling is determined by $$\text{Maximise}\left(\frac{1}{N}\sum_{n=1}^{N}\sum_{i=1}^{P}\sum_{j=1}^{G}\sum_{t=1}^{T}V_{ij}^n x_{ijt} d^t\right) \quad (1)$$

subject to the following constraints:

$$\frac{1}{N}\sum_{n=1}^{N}\sum_{i=1}^{P}\sum_{j=1}^{G}R_i^n x_{ijt} \leq R_t^0, \quad \text{for all } t \quad (2)$$

$$\frac{1}{N}\sum_{n=1}^{N}\sum_{i=1}^{P}\sum_{j=1}^{G}Q_{ij}^n x_{ijt} \leq Q_t^0, \quad \text{for all } t \quad (3)$$

$$y_{i,t-1} \leq y_{it}, \quad \text{for all } i \text{ and } t \quad (4)$$

$$\sum_{\tau=1}^{t}\sum_{j=1}^{G}x_{ij\tau} \leq y_{it}, \quad \text{for all } i \quad (5)$$

$$y_{it} \leq \sum_{j=1}^{G}\sum_{\tau=1}^{T}x_{kj\tau}, \quad \text{for all } i, t \text{ and } k \subset S_i \quad (6)$$

$$\sum_{j=1}^{G}\delta_{jt} = 1, \quad \text{for all } t \quad (7)$$

$$x_{ijt} \leq \delta_{jt}, \quad \text{for all } i, j, \text{ and } t \quad (8)$$

wherein;
T is the number of scheduling periods;
N is the number of simulations;
P is the total number of panels;
G is the number of all possible cutoff grades;
$R_i^n$ is the total rock in the panel i in simulations n.
$Q_{ij}^n$ is the total ore in the panel i, simulation n, when mined with the COG j;
$V_{ij}^n$ is the value of the panel i, simulation n, when mined and processed with the COG j;
$R_t^0$ is the maximum mining capacity in period t;
$Q_t^0$ is the maximum processing rate in period t;
$S_i$ is the set of panels that must be removed before starting the panel i;
$d^t$ is the time discount factor;
$x_{ijt}$ is the fraction of the panel i is extracted with the COG j in period t;
$y_{it}$ is a binary variable equal to 1 if the extraction of the panel i has started in periods 1 to t, and equal to 0 otherwise;
$\delta_{ij}$ is a binary variable controlling the selection of the COG applied in period t.

According to a further aspect, the invention may be said to reside in an apparatus for scheduling the extraction of a resource contained within a medium, comprising:
a processor for receiving drillhole grade data relating to the resource contained within the medium;

a processor for creating a block model with each block in the model having a resource grade;

a processor for scheduling extraction of blocks based on a variable cut-off grade value to increase expected net present value, the variable cut-off grade being represented by a non-linear function; and a processor for converting the non-linear representation to a linear representation and using a mixed integer programming formulation for a simultaneous optimisation of an extraction sequence provided by the scheduled extraction and cut-off grade policy.

In the preferred embodiment of the invention, the processor is for converting the non-linear function to a plurality of linear values by producing a plurality of step values relating to the non-linear function, and selecting one of the values to provide the cut-off grade decision by the mixed integer programming function.

In one embodiment of the invention, the block model is a deterministic model built by spatial interpretation of the data using a Kriging procedure. Thus, in this embodiment, only a single model is provided.

However, in the preferred embodiment of the invention, the block model is a conditional simulation producing a plurality of different block models providing a number of equally probably realisations of block models honouring the drillhole data and first and second order statistics of the resource distributed in the medium represented, respectively, by probability distribution and variogram.

In one embodiment of the invention, the number of blocks in each of the block models is reduced by aggregating blocks prior to the step of scheduling extraction.

In the preferred embodiment of the invention, the processor is for averaging of resource grade valuations from the block models and the average of the resource grade valuations is used to produce the scheduled extraction of blocks and the cut-off grade value to increase expected net present value.

In one embodiment of the invention, the scheduled extraction of blocks may be optimised by considering the average valuation produced from the conditional simulations.

However, in the preferred embodiment of the invention, the processor is for optimizing all of the conditional simulations to produce a plurality of extraction schedules, each having valuations and the valuations are averaged to produce the net present value, and the extraction schedule comprises the extraction schedule which is closest to that giving the net present value.

In the preferred embodiment of the invention, the extraction schedule determines whether resource and medium corresponding to each block is sent for processing, sent to waste or stockpiled for later processing.

Preferably the scheduling is determined by the processor by the following:

$$\text{Maximise}\left(\frac{1}{N}\sum_{n=1}^{N}\sum_{i=1}^{P}\sum_{j=1}^{G}\sum_{t=1}^{T}V_{ij}^{n}x_{ijt}d^{t}\right) \quad (1)$$

subject to the following constraints:

$$\frac{1}{N}\sum_{n=1}^{N}\sum_{i=1}^{P}\sum_{j=1}^{G}R_{i}^{n}x_{ijt} \le R_{t}^{0}, \quad \text{for all } t \quad (2)$$

$$\frac{1}{N}\sum_{n=1}^{N}\sum_{i=1}^{P}\sum_{j=1}^{G}Q_{ij}^{n}x_{ijt} \le Q_{t}^{0}, \quad \text{for all } t \quad (3)$$

$$y_{i,t-1} \le y_{it}, \quad \text{for all } i \text{ and } t \quad (4)$$

$$\sum_{\tau=1}^{t}\sum_{j=1}^{G}x_{ij\tau} \le y_{it}, \quad \text{for all } i \quad (5)$$

$$y_{it} \le \sum_{j=1}^{G}\sum_{t=1}^{T}x_{kj\tau}, \quad \text{for all } i, t \text{ and } k \subset Si \quad (6)$$

$$\sum_{j=1}^{G}\delta_{jt} = 1, \quad \text{for all } t \quad (7)$$

$$x_{ijt} \le \delta_{jt}, \quad \text{for all } i, j, \text{ and } t \quad (8)$$

wherein;
T is the number of scheduling periods;
N is the number of simulations;
P is the total number of panels;
G is the number of all possible cutoff grades;
$R_i^n$ is the total rock in the panel i in simulations n.
$Q_{ij}^n$ is the total ore in the panel i, simulation n, when mined with the COG j;
$V_{ij}^n$ is the value of the panel i, simulation n, when mined and processed with the COG j;
$R_t^0$ is the maximum mining capacity in period t;
$Q_t^0$ is the maximum processing rate in period t;
$S_i$ is the set of panels that must be removed before starting the panel i;
$d^t$ is the time discount factor;
$x_{ijt}$ is the fraction of the panel i is extracted with the COG j in period t;
$y_{it}$ is a binary variable equal to 1 if the extraction of the panel i has started in periods 1 to t, and equal to 0 otherwise;
$\delta_{jt}$ is a binary variable controlling the selection of the COG applied in period t.

According to a further aspect, the invention may be said to reside in a computer program for scheduling the extraction of a resource contained within a medium, comprising the steps of:

code for receiving drillhole grade data relating to the resource contained within the medium;

code for creating a block model with each block in the model having a resource grade;

code for scheduling extraction of blocks based on a variable cut-off grade value to increase expected net present value, the variable cut-off grade being represented by a non-linear function; and code for converting the non-linear representation to a linear representation and using a mixed integer programming formulation for a simultaneous optimisation of an extraction sequence provided by the scheduled extraction and cut-off grade policy.

In the preferred embodiment of the invention, the non-linear function is converted to a plurality of linear values by producing a plurality of step values relating to the non-linear function, and selecting one of the values to provide the cut-off grade decision by the mixed integer programming function.

In one embodiment of the invention, the block model is a deterministic model built by spatial interpretation of the data using a Kriging procedure. Thus, in this embodiment, only a single model is provided.

However, in the preferred embodiment of the invention, the block model is a conditional simulation producing a plurality of different block models providing a number of equally probably realisations of block models honouring the drillhole data and first and second order statistics of the resource distributed in the medium represented, respectively, by probability distribution and variogram.

In one embodiment of the invention, the number of blocks in each of the block models is reduced by aggregating blocks prior to the step of scheduling extraction.

In the preferred embodiment of the invention, the plurality of block models are used to provide an average of resource grade valuations and the average of the resource grade valuations is used to produce the scheduled extraction of blocks and the cut-off grade value to increase expected net present value.

In one embodiment of the invention, the scheduled extraction of blocks may be optimised by considering the average valuation produced from the conditional simulations.

However, in the preferred embodiment of the invention, all of the conditional simulations are optimised to produce a plurality of extraction schedules, each having valuations and the valuations are averaged to produce the net present value, and the extraction schedule comprises the extraction schedule which is closest to that giving the net present value.

In the preferred embodiment of the invention, the extraction schedule determines whether resource and medium corresponding to each block is sent for processing, sent to waste or stockpiled for later processing.

Preferably the scheduling is determined by $$\text{Maximise}\left(\frac{1}{N}\sum_{n=1}^{N}\sum_{i=1}^{P}\sum_{j=1}^{G}\sum_{t=1}^{T} V_{ij}^n x_{ijt} d^t\right) \quad (1)$$

subject to the following constraints:

$$\frac{1}{N}\sum_{n=1}^{N}\sum_{i=1}^{P}\sum_{j=1}^{G} R_i^n x_{ijt} \le R_t^0, \quad \text{for all } t \quad (2)$$

$$\frac{1}{N}\sum_{n=1}^{N}\sum_{i=1}^{P}\sum_{j=1}^{G} Q_{ij}^n x_{ijt} \le Q_t^0, \quad \text{for all } t \quad (3)$$

$$y_{i,t-1} \le y_{it}, \quad \text{for all } i \text{ and } t \quad (4)$$

$$\sum_{\tau=1}^{t}\sum_{j=1}^{G} x_{ij\tau} \le y_{it}, \quad \text{for all } i \quad (5)$$

$$y_{it} \le \sum_{j=1}^{G}\sum_{t=1}^{T} x_{kj\tau}, \quad \text{for all } i, t \text{ and } k \subset Si \quad (6)$$

$$\sum_{j=1}^{G} \delta_{jt} = 1, \quad \text{for all } t \quad (7)$$

$$x_{ijt} \le \delta_{jt}, \quad \text{for all } i, j, \text{ and } t \quad (8)$$

wherein;
T is the number of scheduling periods;
N is the number of simulations;
P is the total number of panels;
G is the number of all possible cutoff grades;
$R_i^n$ is the total rock in the panel i in simulations n.
$Q_{ij}^n$ is the total ore in the panel i, simulation n, when mined with the COG j;
$V_{ij}^n$ is the value of the panel i, simulation n, when mined and processed with the COG j;
$R_t^0$ is the maximum mining capacity in period t;
$Q_t^0$ is the maximum processing rate in period t;
$S_i$ is the set of panels that must be removed before starting the panel i;
$d^t$ is the time discount factor;
$x_{ijt}$ is the fraction of the panel i is extracted with the COG j in period t;
$y_{it}$ is a binary variable equal to 1 if the extraction of the panel i has started in periods 1 to t, and equal to 0 otherwise;
$\delta_{jt}$ is a binary variable controlling the selection of the COG applied in period t.

BRIEF DESCRIPTION OF THE DRAWINGS

Embodiments of the invention will be described, by way of example, with reference to the accompanying drawings in which.

DETAILED DESCRIPTION OF THE EMBODIMENTS

Figure 1:
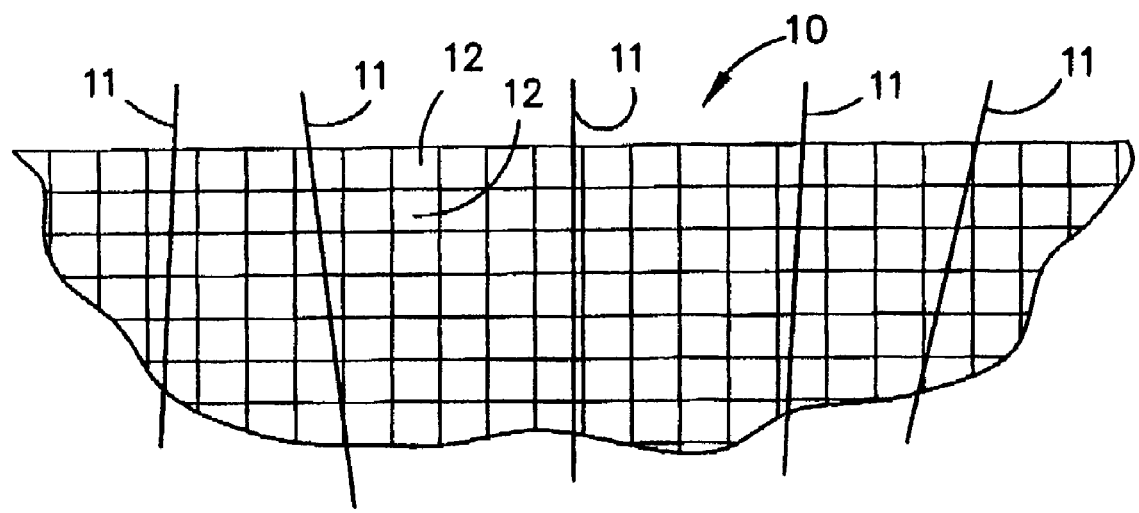
FIG. 1 is a diagram showing an open cut mine in which a resource is distributed in a medium (such as an ore body in earth and rock) in which a block model has been overlaid.

With reference to FIG. 1 an open cut mine 10 is shown which is comprised of a resource such as an ore body which is distributed in a medium such as earth and rock.

The open cut mine 10 is to be mined over a significant period, such as 10-30 years, and the preferred embodiment of the invention is concerned with optimising return from the mine by scheduling mining phases to maximum net present value of the mine 10.

The mine 10 is initially surveyed by drilling a plurality of drillholes represented by the lines 11 to provide data relating to the resource contained within the mine. The data comprises the grade of the resource at particular locations of the drill holes 11. Typically the data will provide a value which represents the grade of the resource as a percentage such as 0.1%, 0.6%, 1%, etc.

A block model of the mine 10 is created which is formed from a plurality of blocks 12. Typically, the block model may contain up to half a million blocks.

The blocks 12 provide an ore body model of blocks built up by the spatial interpolation of the data obtained from the drillholes 11.

Typically, it is desirable to mine the most valuable parts of the mine as quickly or as early as possible. Also typically, the most valuable parts of the mine are likely to be well below ground level, which means that a large amount of rock and earth needs to be removed before the most valuable deposits are uncovered. The preferred embodiments of the invention therefore seek to optimise the mining schedule so that regions of the mine represented by various ones of the blocks are removed to enable the most valuable deposits to be uncovered as quickly as possible. The blocks which are mined prior to those blocks need to be considered to determine whether they are to be forwarded to waste, stockpiled for later processing, or forwarded direct to processing. By interpolating the grade of the ore in each of the blocks, a decision can be made at a particular time as to whether it is desirable to forward the mined material for processing or whether that is uneconomical and the material should merely be sent to waste or stockpiled for later processing.

Figure 2:
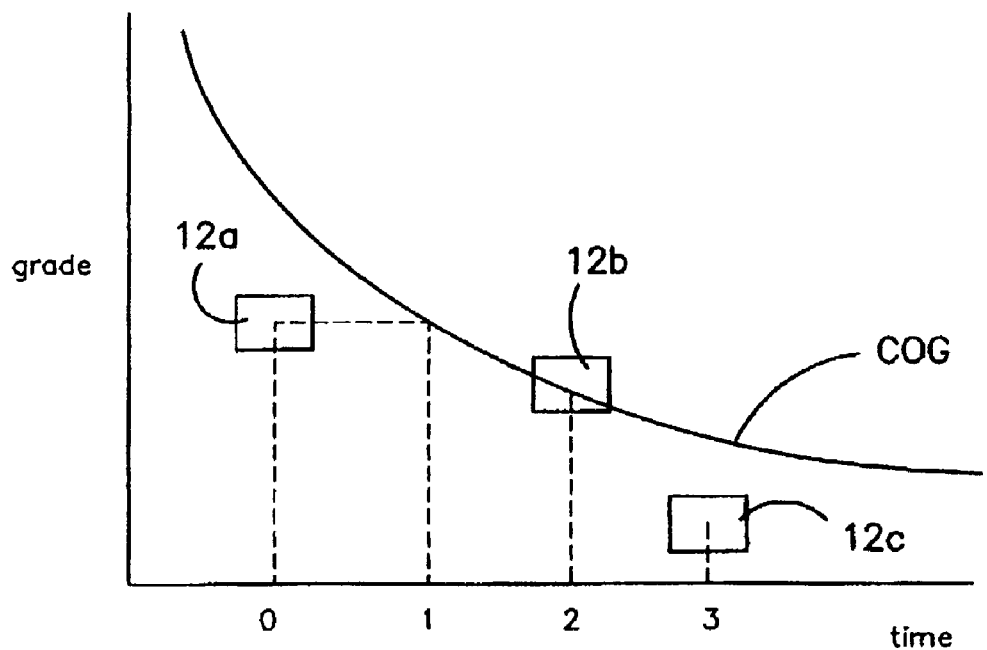
FIG. 2 is a graph showing COG against time.

In order to determine whether a block is forwarded for processing, stockpiled or sent to waste, a cut-off grade value is established. For example, the cut-off grade at a particular time may be 0.6%. Thus, any blocks which have a grade above 0.6% are sent for processing. However, if the grade is below 0.6%, a decision is made as to whether the block is simply sent to waste or whether it is stockpiled for later processing. FIG. 2 is a graph which illustrates cut-off grade with respect to time and shows three blocks which may need to be mined at particular times. For example, block 12a which is mined at time T0 may have a grade which does not justify processing at time T0 but which will justify processing at a later time T1. Thus, the block 12a can be stockpiled for processing at the later time T1. Block 12b which is mined at T2 has a grade which justifies processing at the time T2, and therefore may be sent immediately to processing. Block 12c has a grade which is below the cut-off grade and at no future time has a grade which equals the cut-off grade and therefore, is sent to waste. The preferred embodiment of the invention targets all phases of mine optimisation, including the net present value optimal block extraction sequence, pushback design, and simultaneous cut-off grade and mining schedule optimisation.

Figure 3:
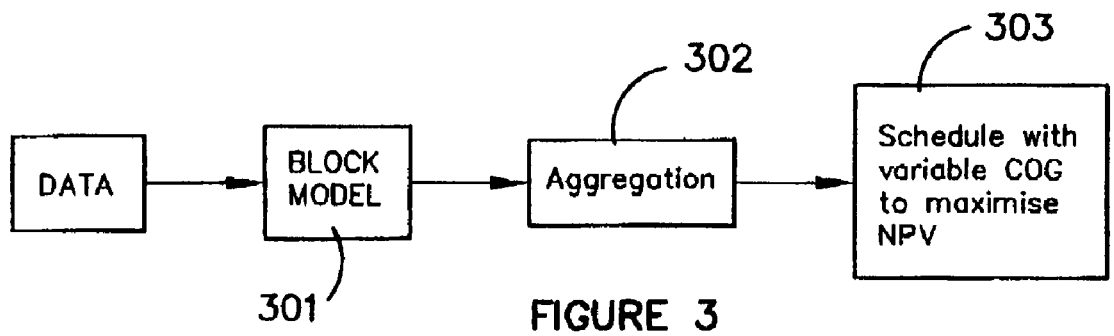
FIG. 3 is a block diagram according to one embodiment of the invention.

One embodiment of the invention is shown in FIG. 3. With reference to this figure, the data acquired from the bore holes 11 is used to create a deterministic block model 201 to thereby provide the blocks 12 having assigned grade values. The deterministic block model 201 is created by spatial interpolation of drillhole data, preferably using a Kriging procedure.

The number of blocks in the block model 301 may be reduced by aggregation of the blocks at step 302. The aggregation of the blocks is disclosed in our International Patent Application Nos. PCT/AU2003/001298 and PCT/AU2003/001299. The contents of these two International applications are incorporated into this specification by this reference.

However the invention is applicable to any sort of aggregation that is spatially connected and respects geometrical block extraction precedence constraints.

At step 303, a block removal schedule is created based on a variable cut-off grade to maximise net present value of the mine 10.

The use of a variable cut-off grade introduces a significant disadvantage in that optimisation of the schedule to obtain maximised net present value using variable cut-off grade in its direct formulation leads to a non-linear problem. This is much harder to solve than a linear problem or linear value which occurs if a fixed variable cut-off grade is used in the formulation. To overcome this disadvantage, the preferred embodiment of the invention provides a linearisation of the problem, making it possible to use a mixed integer programming formulation for a simultaneous optimisation of the extraction sequence and cut-off grade.

Figure 4:
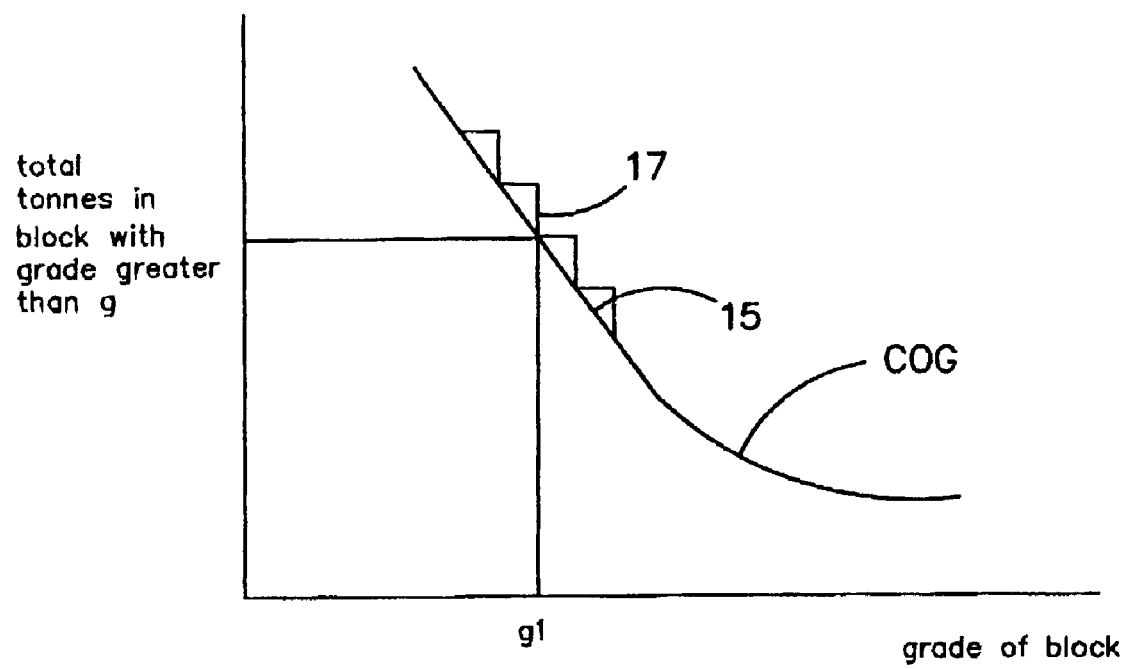
FIG. 4 is a graph showing the non-linear representation of variable cut-off grade.

FIG. 4 is a graph representing the non-linear cut-off grade 15 which is a plot of total tonnes in a block with a grade greater than grade plotted against grade. In order to linearise the problem, the function 15 is divided into a number of linear steps represented at 17, each providing a discrete grade value such as G1, as shown in FIG. 4. The grade value G1 is selected using a mixed integer programming formulation for the simultaneous optimisation of the extraction sequence and the cut-off grade.

Thus, this enables a schedule of block removal to be determined using a variable cut-off grade which maximises the net present value of the mine. Thus, return from the mining operation is optimised at any particular time.

Figure 5:
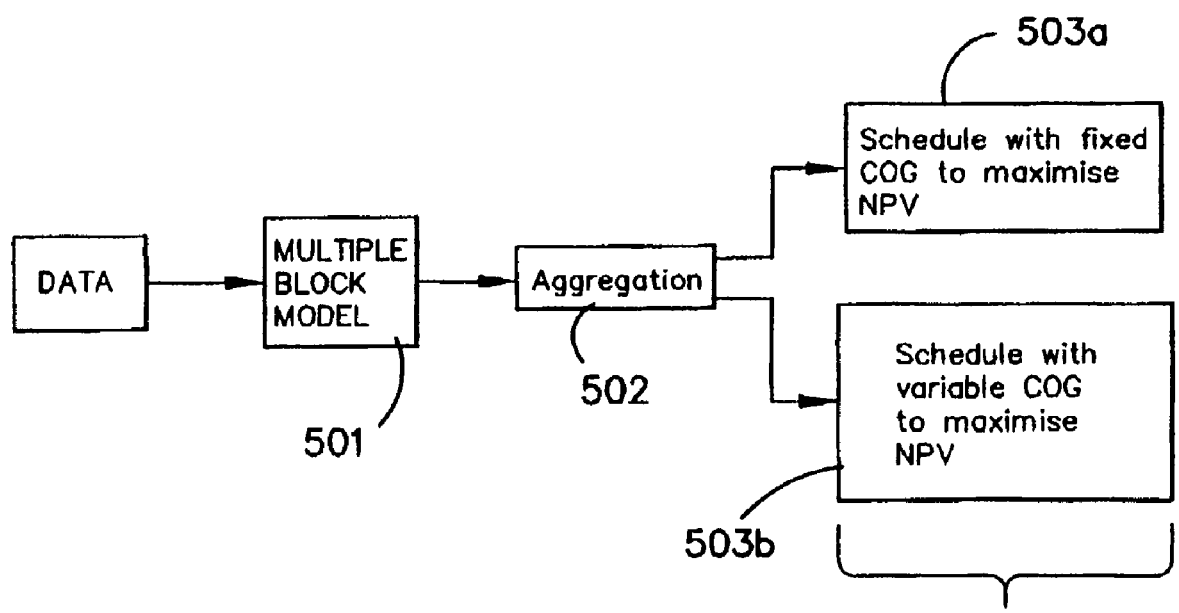
FIG. 5 is a block diagram showing net present value estimations according to embodiments of the invention.

FIG. 5 is a block diagram showing a still further embodiment of the invention, and the most preferred embodiment of the invention. In FIG. 5 the data previously described is used to create multiple block models because the drillhole data is typically too sparse to support a unique and deterministic block model in accordance with the embodiment of FIG. 3. Thus, the likelihood of the block model produced with reference to FIG. 3 matching actual reality is uncertain and questionable. Thus, a better approach is to use multiple block models which are created by conditional simulation techniques. The conditional simulation techniques allow the generation of a number of equally probably block models, all of which honour the drillhole data obtained from the drillholes 11 and first and second order statistics of the ore body represented, respectively, by probably distribution and variogram (e.g. Isaaks and Srivastava, 1989).

Once again, the number of blocks in each of the models 501 may be reduced by aggregation 502 in the manner referred to in the aforementioned International applications. The block aggregation formed according to the algorithm set forth in the aforesaid International application, preserves the required slope constraints and is very flexible allowing the user to fully control the size and shape of the aggregation. The optimisation according to the embodiments of the invention can be applied to any aggregation of blocks with a set of precedence arcs, prescribing which blocks should be extracted before a particular given block.

At step 303, a schedule 503 of block removal is created dependent upon a cut-off grade value to maximise the net present value of the mine. The cut-off grade value which is used may be a fixed cut-off grade value 503a shown in FIG. 5 or, in the most preferred embodiment of the invention, a variable cut-off grade value 503b which is the same as the variable cut-off grade value described with reference to FIG. 3.

The simplest and most straight forward use of the multiple block models 501 is to estimate the variability in the projected net present value associated with the ore body uncertainty by valuing the optimal schedule obtained from the Kriged model through each of the conditionally simulated realisations. This is shown in FIG. 6A in which, for example, ten conditional simulations are generated and those ten conditional simulations are immediately averaged at step 601.

FIGS. 3 and 5 schematically show an apparatus in the form of a processor which may be a personal computer or the like for performing the method of the preferred embodiment.

Figure 6A:
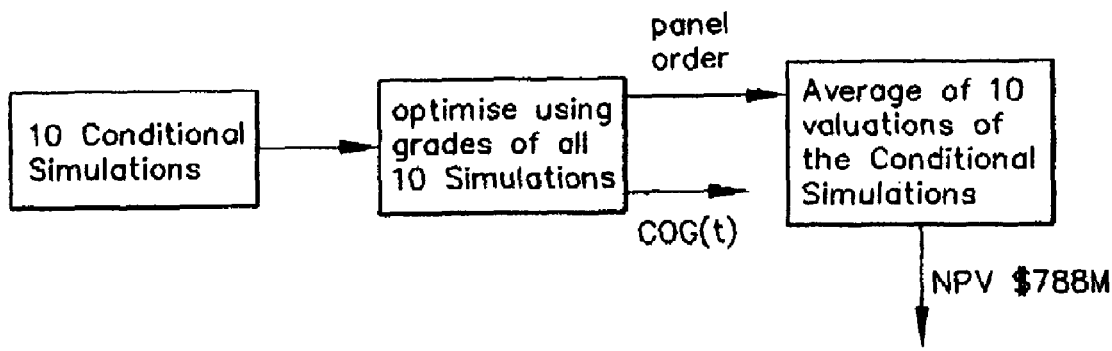
FIGS. 6A and 6B are diagrams showing various valuations of net present value.
Figure 6B:
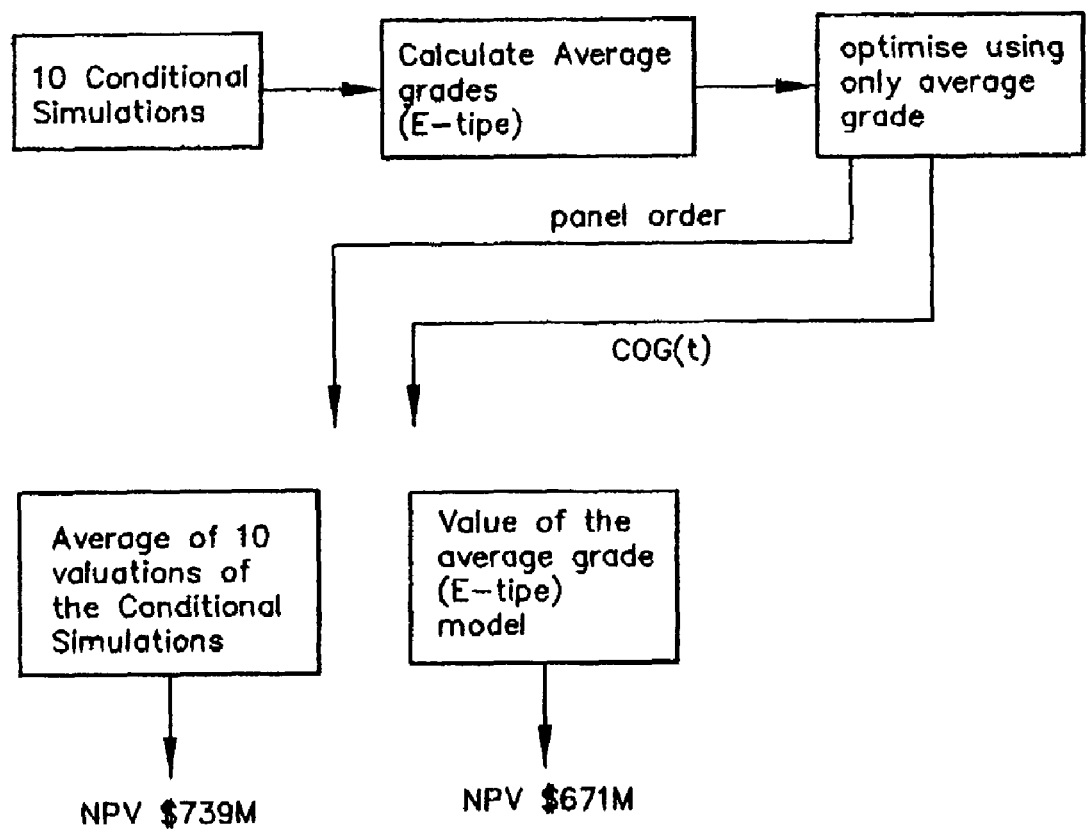

FIGS. 6A and 6B are an actual example of valuations of a known pit.

FIG. 6A shows the preferred embodiment of the invention and is a schedule determination which gives the best estimate of the net present value of a mine. In FIG. 6A it is noted that the optimization uses all ten simulations of the conditional simulation represented in FIG. 6A.

1. COG is less than all conditional simulation grades. COG=0.03% Cu, equivalent to a processing cost of 0.60 $/tonne.
2. COG is greater than only one of the conditional simulation grades. COG=0.05% Cu, equivalent to a processing cost of 1.00 $/tonne.
3. COG is greater than two of the conditional simulation grades. COG=0.08% Cu, equivalent to a processing cost of 1.60 $/tonne.
4. COG is greater than all conditional simulation grades. COG=0.12% Cu, equivalent to a processing cost of 2.40 $/tonne.

The block valuation will be performed for each situation.

| Situation | COG (% Cu) | Block Processing Cost ($) | Conditional Simulation Value ($) 1 | 2 | 3 | Conditional Simulation Average Value ($) | E-type Value ($) | Conditional Simulation Value Premium ($) |
|---|---|---|---|---|---|---|---|---|
| 1 | 0.03 | 6000 | 2000 | 6000 | 16000 | 8000 | 8000 | 0 |
| 2 | 0.05 | 10000 | 0 | 2000 | 12000 | 4667 | 4000 | 667 |
| 3 | 0.08 | 16000 | 0 | 0 | 6000 | 2000 | 0 | 2000 |
| 4 | 0.12 | 24000 | 0 | 0 | 0 | 0 | 0 | 0 |

FIG. 6B shows optimization using only an average grade rather than all ten simulations, and shows that an increased net present value is still obtained if the average of the ten valuations of the conditional simulations are used later rather than earlier in the process.

In FIG. 6B the term E-type represents the average of the conditional simulations, equivalent to the Kriged model. Here, we explain the difference between the $671 M and $739M valuations that use identical extraction and cut-off grade (COG) schedules. In following this explanation, it is important to realise that each conditional simulation is an equally likely representation of the true block grade.

The extra value arises because the conditional simulations can be valued individually using the prescribed COG, then their value averaged, as compared to the case with the "average" E-type model where the averaging is done earlier, at the grade level. A very simple single block model with no discounting will be used to illustrate this.

Single Block Model Example

The following data is used-the average value corresponds to the E-type block model. This is a single block model with only three conditional simulations.

| | |
|---|---|
| Block mass (tonnes) | 10,000 |
| Number of blocks | 1 |
| Conditional simulations | 3 |
| Grade in each conditional simulation (% Cu) | [0.04, 0.06, 0.11] |
| Average block grade (% Cu) [E-type value] | 0.07 |
| Tonnes of Cu in each conditional simulation | [4, 6, 11] |
| Average block tonnes of Cu [E-type value] | 7 |
| Revenue per tonne of Cu ($) | 2,000 |
| Block value as waste ($) (Zero mining cost!) | 0 |

In valuing this block, we will use a marginal COG (Processing Cost=Revenue), and look at four situations, represented by four different processing costs. The marginal COG is calculated thus: (Block Tonnes)*COG*(Revenue/tonne)= (Block Tonnes)*(Processing Cost/tonne) COG=(Processing Cost/tonne)/(Revenue/tonne)

This example demonstrates that whenever the conditional simulated grades for a block are found to be distributed on both sides of the COG, the block valuation for the average of the conditional simulations will be greater than the valuation of the average grade (Kriged) model.

The following observations may be helpful:
In situation 2, the E-type valuation effectively attributes negative value to the first conditional simulation, whereas when the conditional simulations are valued separately this instance is attributed exactly zero value—its value as waste.
In situation 3, the E-type valuation ignores the value of one of the conditional simulations.

The valuation using the conditional simulations is more realistic because when a block is mined, blast hole assays can be used to determine a close estimate of the actual block grade. With this near-perfect information about block grade, we can make an accurate assessment of whether to process or waste a block. This is equivalent to valuing each conditional simulation individually as if each were an actual reality.

Thus, by using the multiple simulations to produce multiple valuations and then averaging the multiple valuations in order to produce the net present value, a higher expected net present value is obtained than if the multiple simulations are first averaged and simply that average is then used to produce a valuation.

As previously mentioned, the preferred embodiment of the invention uses mixed integer programming formulation to include the multiple conditional simulations and variable cut-off grades. This approach allows one to estimate the gap between the obtained solution and the upper theoretical limit. To illustrate this, an example of how optimisation is generated will be given by reference to a simple case in which one rock-type contains one metal type, which can be processed through one processing plant, generalisation to the case of multiple rock types, metals and processing streams is cumbersome but straight forward. For simplicity, we consider below only the case of a discrete set of cut-off grades that is possible to generalise the results to the continuous cut-off grade case. The following notations are used:

T is the number of scheduling periods;
N is the number of simulations;
P is the total number of panels;
G is the number of all possible cutoff grades;
$R_i^n$ is the total rock in the panel i in simulations n.
$Q_{ij}^n$ is the total ore in the panel i, simulation n, when mined with the COG j;
$V_{ij}^n$ is the value of the panel i, simulation n, when mined and processed with the COG j;
$R_t^0$ is the maximum mining capacity in period t;
$Q_t^0$ is the maximum processing rate in period t;
$S_i$ is the set of panels that must be removed before starting the panel i;
$d^t$ is the time discount factor;
$x_{ijt}$ is the fraction of the panel i is extracted with the COG j in period t;
$y_{it}$ is a binary variable equal to 1 if the extraction of the panel i has started in periods 1 to t, and equal to 0 otherwise;
$\delta_{jt}$ is a binary variable controlling the selection of the COG applied in period t;

The MIP formulation is:

$$\text{Maximise}\left(\frac{1}{N}\sum_{n=1}^{N}\sum_{i=1}^{P}\sum_{j=1}^{G}\sum_{t=1}^{T} V_{ij}^n x_{ijt} d^t\right) \quad (1)$$

subject to the following constraints:

$$\frac{1}{N}\sum_{n=1}^{N}\sum_{i=1}^{P}\sum_{j=1}^{G} R_i^n x_{ijt} \leq R_t^0, \quad \text{for all } t \quad (2)$$

$$\frac{1}{N}\sum_{n=1}^{N}\sum_{i=1}^{P}\sum_{j=1}^{G} Q_{ij}^n x_{ijt} \leq Q_t^0, \quad \text{for all } t \quad (3)$$

$$y_{i,t-1} \leq y_{it}, \quad \text{for all } i \text{ and } t \quad (4)$$

$$\sum_{\tau=1}^{t}\sum_{j=1}^{G} x_{ij\tau} \leq y_{it}, \quad \text{for all } i \quad (5)$$

$$y_{it} \leq \sum_{j=1}^{G}\sum_{\tau=1}^{T} x_{kj\tau}, \quad \text{for all } i, t \text{ and } k \subset Si \quad (6)$$

$$\sum_{j=1}^{G} \delta_{jt} = 1, \quad \text{for all } t \quad (7)$$

$$x_{ijt} \leq \delta_{jt}, \quad \text{for all } i, j, \text{ and } t \quad (8)$$

The objective function (1) represents the discounted cash flow. Constraints (2) and (3) enforce the mining and processing limits on average. Constraints (4)-(6) enforce the panel extraction precedence constraints, and constraints (7) and (8) ensure that the same COG is applied to all panels extracted in any given time period. This MIP formulation is solved by the commercially available software package CPLEX version 9.0, by ILOG Inc.

Figure 7:
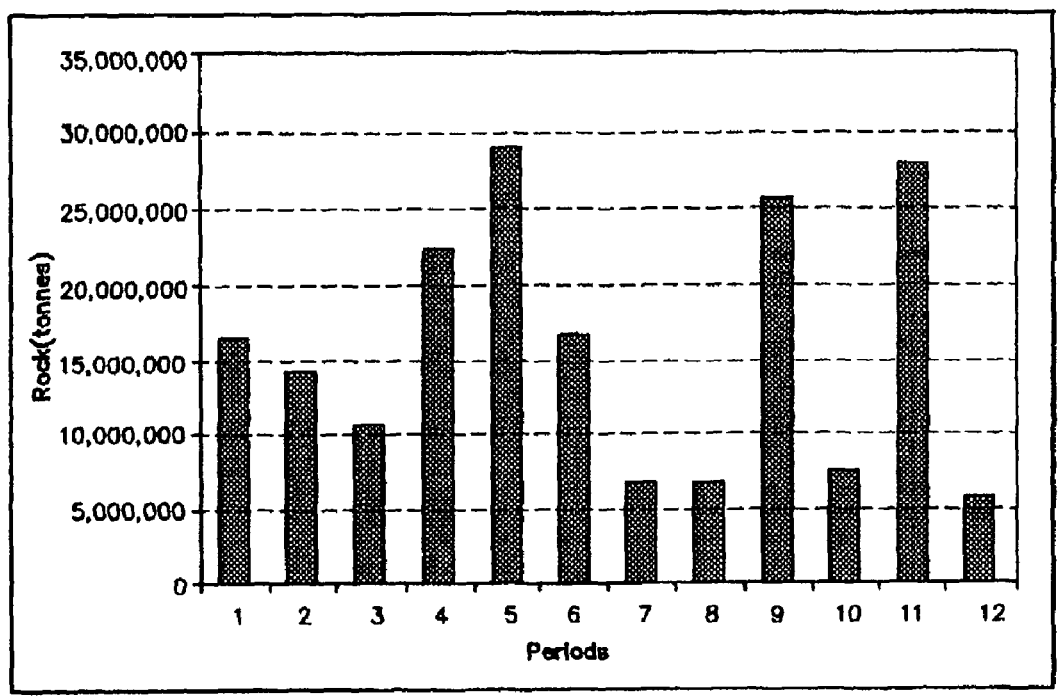
FIG. 7 is a graph showing mining schedule optimised with a marginal cut-off grade.
Figure 8:
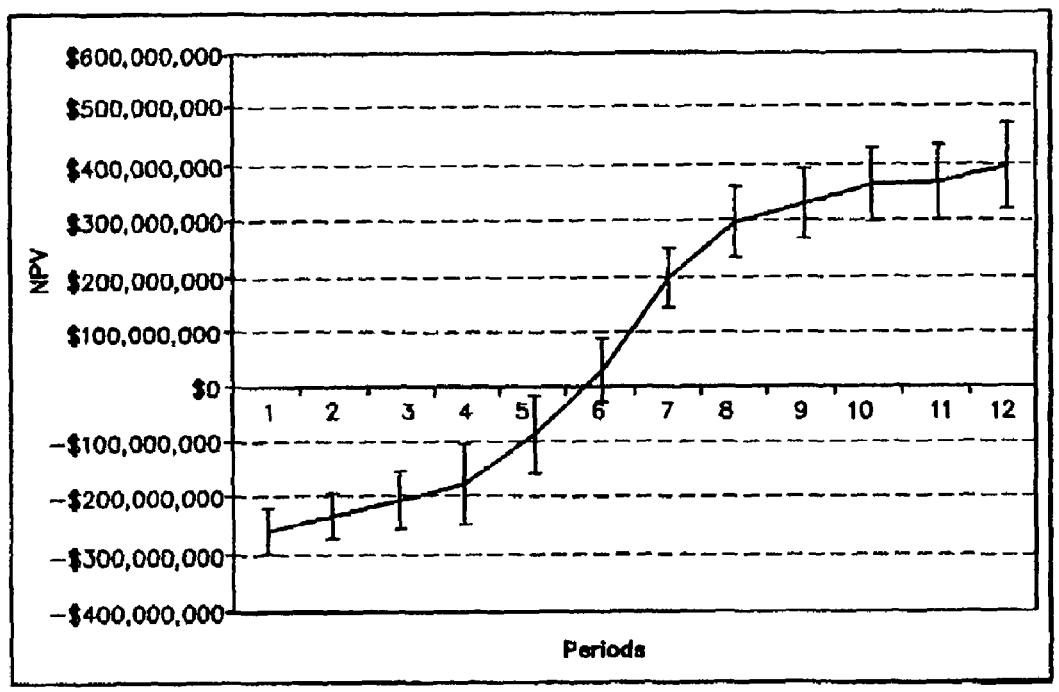
FIG. 8 is a graph showing net present value of the schedule optimisation with the marginal cut-off grade.
Figure 9:
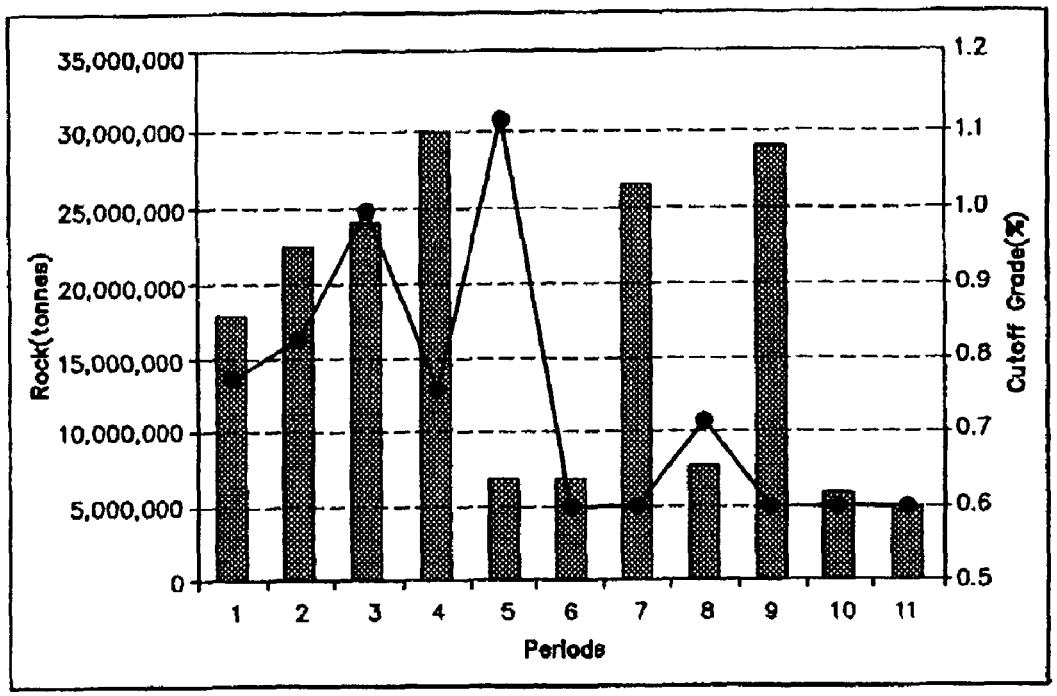
FIG. 9 is a graph showing a mining schedule optimised with a mean grade model.
Figure 10:
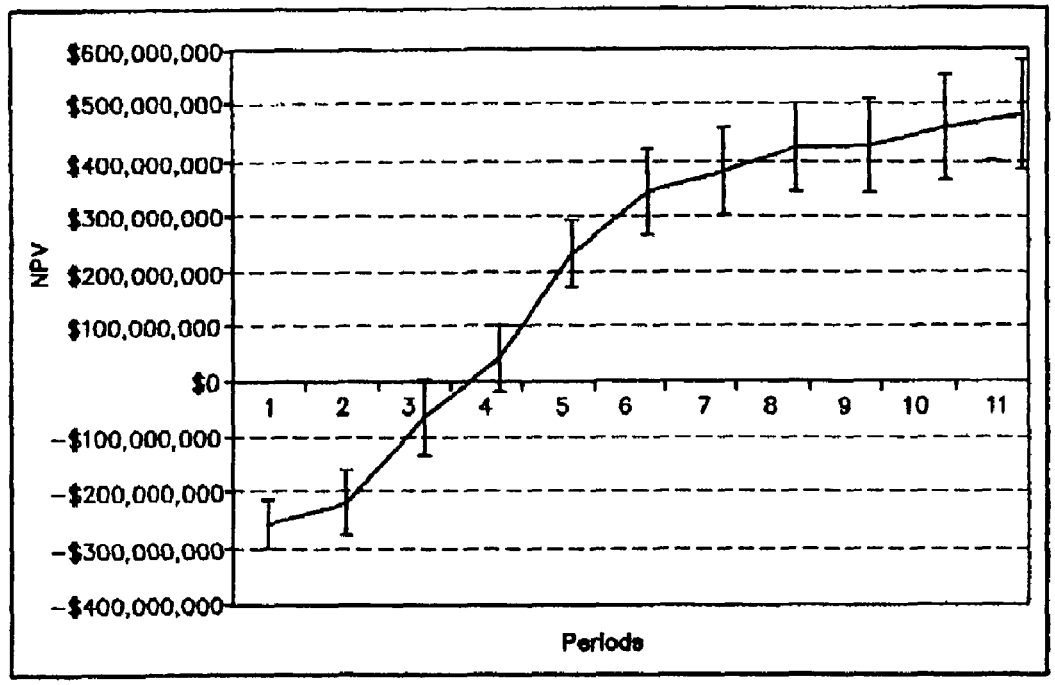
FIG. 10 is a graph showing net present value of the scheduled optimisation with the mean grade model.
Figure 11:
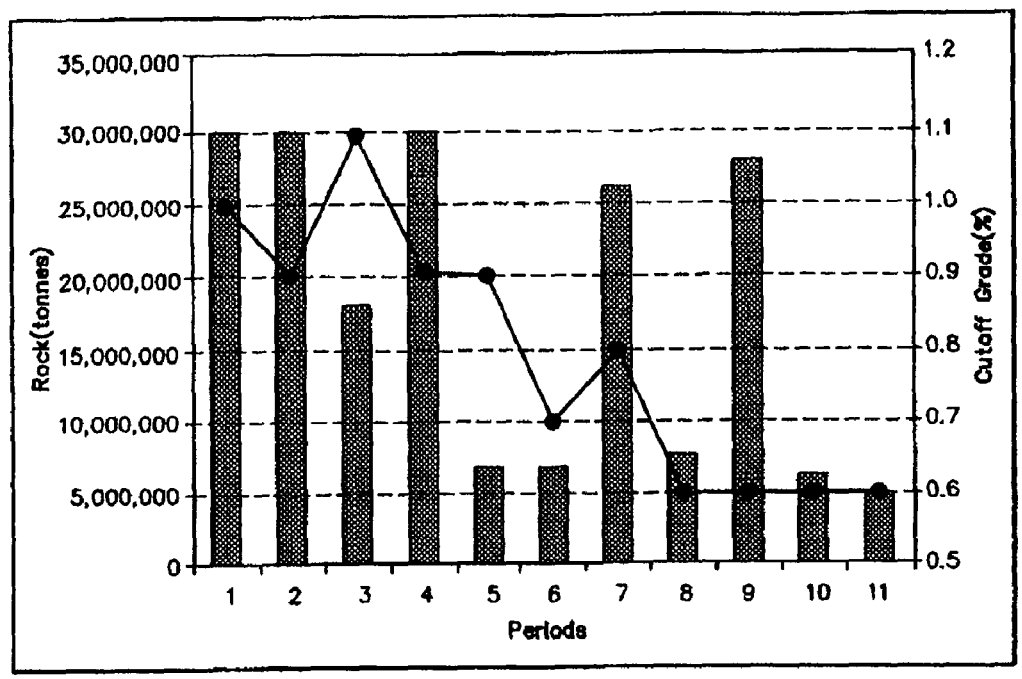
FIG. 11 is a graph showing mining schedule optimised with a set of conditional simulations.
Figure 12:
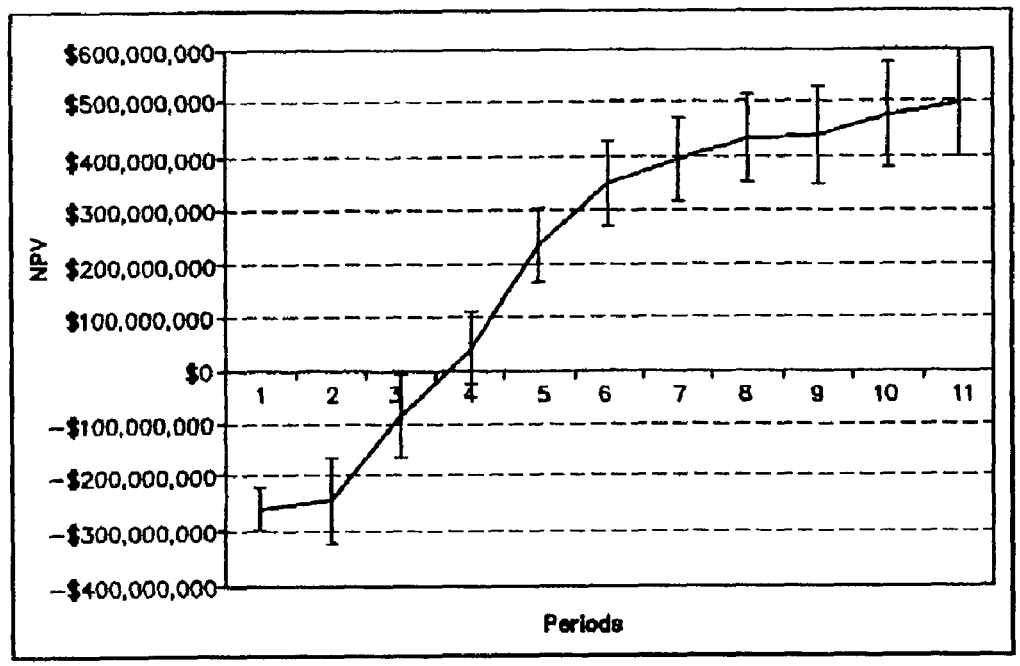
FIG. 12 is a graph showing net present value of the schedule optimised with the set of conditional simulations.

To test the algorithm we have chosen 10 conditional simulations of a block model containing one type of metal and using one processing plant. Because of confidentiality requirements all the economic parameters were rescaled and do not represent reality. However, all the relative characteristics which demonstrate the potential of the new method are not affected by the resealing. The ultimate pit for the design was chosen by using the Lersch-Grossmann algorithm (Lersch and Grossmann, 1965) and the procedure similar to that used in Whittle Four-X software. The ultimate pit contains 191 million tonnes of rock and 62.9±2.7 million tonnes of ore (above the marginal COG=0.6%). The undiscounted value in the ultimate pit (if processed with the marginal COG) is $ (1,316±99) million. It was divided into 6 mining phases and scheduled over 12 years. The mining rate was set to 30 MT/year and the processing rate to 5 MT/year. The initial capital investment was assumed to be $300 million, and the discount rate 10%. The base case optimisation was done using the marginal COG and produced the discounted cash flow $(704±31) million, and the NPV was $(404±31) million. The mining schedule and the NPV are shown, respectively, in FIGS. 7 and 8. The second optimisation was done using the variable COG, but was based on the mean grade block model, i.e. it was similar to the one which can be generated by using one deterministic model. The schedule was then evaluated against all 10 realisations of ore body model and produced the NPV=$(485±40) million, an increase of 20% over the base case. The results are shown in FIGS. 9 and 10. The third optimisation was done using the algorithm described above, and produced the NPV=$(505±43) million, a further increase of 4.1% over the case of mean grade based optimisation. The results are shown in FIGS. 11 and 12. The relative variability of NPV in all cases was roughly the same, about 8%. Another important result of the variable COG policy is that the payback period (defined here as the time when the cummulative NPV becomes equal to zero) is decreased from 5 to 3 years.

The increase of 4.1% in NPV may be not seen as a very substantial, but it should be mentioned that the block model considered does not have a high variability. The relative variance in the undiscounted value of the ultimate pit is only 7.6%. There are many deposits which can have variability of the order of 20-30%. For these kind of deposits the potential improvement in the expected NPV may be substantially high.

Thus, according to the preferred embodiment of the invention, an extraction sequence and cut-off grade policy can be determined which, when evaluated through the whole set of conditionally simulated ore bodies, will produce the best possible expected net present value. The degree of accuracy of this optimised schedule can be estimated precisely, in contrast to prior art techniques.

In the claims which follow and in the preceding description of the invention, except where the context requires otherwise due to express language or necessary implication, the word "comprise", or variations such as "comprises" or "comprising", is used in an inclusive sense, ie. to specify the presence of the stated features but not to preclude the presence or addition of further features in various embodiments of the invention.

It is to be understood that the prior art publications referred to herein, do not constitute an admission that that the publication forms a part of the common general knowledge in the art, in Australia or in any other country.

Since modifications within the spirit and scope of the invention may readily be effected by persons skilled within the art, it is to be understood that this invention is not limited to the particular embodiment described by way of example hereinabove.

The invention claimed is:

1. A method of scheduling the extraction of a resource in a mine medium comprising the steps of:
   obtaining drillhole grade data relating to the resource contained within the medium;
   creating a plurality of different block models of the mine with a processor, each formed of a plurality of blocks, each block in each model having a resource grade, each of the block models honouring the drillhole grade data; and generating a single schedule for extraction of blocks from the mine with the processor based on a cut-off grade policy to increase expected net present value having regard to all of the plurality of different block models, wherein the single extraction schedule is determined by the following:

$$\text{Maximise}\left(\frac{1}{N}\sum_{n=1}^{N}\sum_{i=1}^{P}\sum_{j=1}^{G}\sum_{t=1}^{T}V_{ij}^{n}x_{ijt}d^{t}\right) \quad (1)$$

subject to the following constraints:

$$\frac{1}{N}\sum_{n=1}^{N}\sum_{i=1}^{P}\sum_{j=1}^{G}R_{i}^{n}x_{ijt} \leq R_{t}^{0}, \quad \text{for all } t \quad (2)$$

$$\frac{1}{N}\sum_{n=1}^{N}\sum_{i=1}^{P}\sum_{j=1}^{G}Q_{ij}^{n}x_{ijt} \leq Q_{t}^{0}, \quad \text{for all } t \quad (3)$$

$$y_{i,t-1} \leq y_{it}, \quad \text{for all } i \text{ and } t \quad (4)$$

$$\sum_{\tau=1}^{t}\sum_{j=1}^{G}x_{ij\tau} \leq y_{it}, \quad \text{for all } i \quad (5)$$

$$y_{it} \leq \sum_{j=1}^{G}\sum_{\tau=1}^{T}x_{kj\tau}, \quad \text{for all } i, t \text{ and } k \subset S_{i} \quad (6)$$

$$\sum_{j=1}^{G}\delta_{jt} = 1, \quad \text{for all } t \quad (7)$$

$$x_{ijt} \leq \delta_{jt}, \quad \text{for all } i, j, \text{ and } t \quad (8)$$

wherein;
T is the number of scheduling periods;
N is the number of simulations;
P is the total number of panels;
G is the number of all possible cutoff grades;
$R_i^n$ is the total rock in the panel i in simulations n,
$Q_{ij}^n$ is the total ore in the panel i, simulation n, when mined with the COG j;
$V_{ij}^n$ is the value of the panel i, simulation n, when mined and processed with the COG j;
$R_t^0$ is the maximum mining capacity in period t;
$Q_t^0$ is the maximum processing rate in period t;
$S_i$ is the set of panels that must be removed before starting the panel i;
$d^t$ is the time discount factor;
$x_{ijt}$ is the fraction of the panel i is extracted with the COG j in period t;
$y_{it}$ is a binary variable equal to 1 if the extraction of the panel i has started in periods 1 to t, and equal to 0 otherwise;
$\delta_{jt}$ is a binary variable controlling the selection of the COG applied in period t.

2. The method of claim 1 wherein the creation of the plurality of different block models is a conditional simulation technique which provides the generation of a plurality of equally probable block model realisations, all of which honour the data and first and second order statistics of the resource represented, respectively, by probability distribution function and variogram.

3. The method of claim 1 wherein the number of blocks in each of the block models is reduced by aggregating blocks prior to the step of scheduling extraction.

4. The method of claim 1 wherein the cut-off grade is a variable cut-off grade.

5. The method of claim 1 wherein the plurality of block models are used to provide an average of resource grade and block valuations and the average of the resource grade and block valuations is used to produce the scheduled extraction of blocks and the cut-off grade value to increase expected net present value.

6. The method of claim 1 wherein the scheduled extraction of blocks is optimised by considering the average valuation produced from the conditional simulations.

7. The method of claim 1 wherein all of the conditional simulations are optimized simultaneously to produce the single extraction schedule with a variable cut-off grade policy, and wherein all the conditional simulations are valued using the single extraction schedule and the valuations are averaged to produce the expected net present value.

8. The method of claim 1 wherein the single extraction schedule determines whether resource and medium corresponding to each block is sent for processing, sent to waste or stockpiled for later processing.

9. The method of claim 1 wherein the step of scheduling using a variable cut-off grade is converted from a non-linear representation to a linear representation, and a mixed integer programming formulation is used for simultaneous optimisation of the extraction schedule and the cut-off grade.

10. An apparatus for scheduling the extraction of a resource within a medium in a mine from which drillhole grade data relating to the resource contained within the medium has been obtained comprising:

a processor for creating a plurality of different block models of the mine, each formed of a plurality of blocks, each block in each model having a resource grade, each of the block models honouring the drillhole grade data; and a processor for generating a single schedule for extraction of blocks based on a cut-off grade policy to increase expected net present value having regard to all of the plurality of different block models, wherein the single extraction schedule is determined by the following:

$$\text{Maximise}\left(\frac{1}{N}\sum_{n=1}^{N}\sum_{i=1}^{P}\sum_{j=1}^{G}\sum_{t=1}^{T}V_{ij}^{n}x_{ijt}d^{t}\right) \quad (1)$$

subject to the following constraints:

$$\frac{1}{N}\sum_{n=1}^{N}\sum_{i=1}^{P}\sum_{j=1}^{G}R_{i}^{n}x_{ijt} \leq R_{t}^{0}, \quad \text{for all } t \quad (2)$$

$$\frac{1}{N}\sum_{n=1}^{N}\sum_{i=1}^{P}\sum_{j=1}^{G}Q_{ij}^{n}x_{ijt} \leq Q_{t}^{0}, \quad \text{for all } t \quad (3)$$

$$y_{i,t-1} \leq y_{it}, \quad \text{for all } i \text{ and } t \quad (4)$$

$$\sum_{\tau=1}^{t}\sum_{j=1}^{G}x_{ij\tau} \leq y_{it}, \quad \text{for all } i \quad (5)$$

$$y_{it} \leq \sum_{j=1}^{G}\sum_{\tau=1}^{T}x_{kj\tau}, \quad \text{for all } i, t \text{ and } k \subset S_{i} \quad (6)$$

$$\sum_{j=1}^{G}\delta_{jt} = 1, \quad \text{for all } t \quad (7)$$

$$x_{ijt} \leq \delta_{jt}, \quad \text{for all } i, j, \text{ and } t \quad (8)$$

wherein;
T is the number of scheduling periods;
N is the number of simulations;
P is the total number of panels;
G is the number of all possible cutoff grades;
$R_i^n$ is the total rock in the panel i in simulations n,
$Q_{ij}^n$ is the total ore in the panel i, simulation n, when mined with the COG j;
$V_{ij}^n$ is the value of the panel i, simulation n, when mined and processed with the COG j;
$R_t^0$ is the maximum mining capacity in period t;
$Q_t^0$ is the maximum processing rate in period t;
$S_i$ is the set of panels that must be removed before starting the panel i;
$d^t$ is the time discount factor;
$x_{ijt}$ is the fraction of the panel i is extracted with the COG j in period t;
$y_{it}$ is a binary variable equal to 1 if the extraction of the panel i has started in periods 1 to t, and equal to 0 otherwise;
$\delta_{jt}$ a binary variable controlling the selection of the COG applied in period t.

11. The apparatus of claim 10 wherein the processor is for creating conditional simulations which provides the generation of a plurality of equally probable block model realisations, all of which honour the data and first and second order statistics of the resource represented, respectively, by probability distribution function and variogram.

12. The apparatus of claim 10 wherein the processor is also for reducing the number of blocks in each of the block models by aggregating blocks prior to the step of scheduling extraction.

13. The apparatus of claim 10 wherein the cut-off grade is a variable cut-off grade.

14. The apparatus of claim 10 wherein the processor is for providing an average of resource grade and block valuations from the plurality of models, and the average of the resource grade and block valuations is used to produce the scheduled extraction of blocks and the cut-off grade value to increase expected net present value.

15. The apparatus of claim 10 wherein the processor is for scheduling extraction of blocks optimised by considering the average valuation produced from the conditional simulations.

16. The apparatus of claim 10 wherein all of the conditional simulations are optimized simultaneously to produce the single extraction schedule with a variable cut-off grade policy, and wherein all the conditional simulations are valued using the single extraction schedule and the valuations are averaged to produce the expected net present value.

17. The apparatus of claim 10 wherein the extraction schedule determines whether resource and medium corresponding to each block is sent for processing, sent to waste or stockpiled for later processing.

18. The apparatus of claim 10 wherein the processor is for converting from a non-linear representation to a linear representation when a variable cut-off grade is used, and a mixed integer programming formulation is used for simultaneous optimisation of the extraction schedule and the cut-off grade.

19. A tangible computer readable medium comprising a computer program for scheduling the extraction of a resource within a medium in a mine comprising:

code which when executed by a processor receives drill-hole grade data relating to the resource contained within the medium;
code which when executed by a processor creates a plurality of different block models of the mine, each formed of a plurality of blocks, each block in each model having a resource grade, each of the block models honouring the drillhole grade data; and
code which when executed by a processor generates a single schedule for extraction of blocks from the mine based on a cut-off grade policy to increase expected net present value having regard to all of the plurality of different block models, wherein the single extraction schedule is determined by the following:

$$\text{Maximise}\left(\frac{1}{N}\sum_{n=1}^{N}\sum_{i=1}^{P}\sum_{j=1}^{G}\sum_{t=1}^{T}V_{ij}^n x_{ijt} d^t\right) \quad (1)$$

subject to the following constraints:

$$\frac{1}{N}\sum_{n=1}^{N}\sum_{i=1}^{P}\sum_{j=1}^{G} R_i^n x_{ijt} \le R_t^0, \quad \text{for all } t \quad (2)$$

$$\frac{1}{N}\sum_{n=1}^{N}\sum_{i=1}^{P}\sum_{j=1}^{G} Q_{ij}^n x_{ijt} \le Q_t^0, \quad \text{for all } t \quad (3)$$

$$y_{i,t-1} \le y_{it}, \quad \text{for all } i \text{ and } t \quad (4)$$

$$\sum_{\tau=1}^{t}\sum_{j=1}^{G} x_{ij\tau} \le y_{it}, \quad \text{for all } i \quad (5)$$

$$y_{it} \le \sum_{j=1}^{G}\sum_{t=1}^{T} x_{kj\tau}, \quad \text{for all } i, t \text{ and } k \subset S_i \quad (6)$$

$$\sum_{j=1}^{G} \delta_{jt} = 1, \quad \text{for all } t \quad (7)$$

$$x_{ijt} \le \delta_{jt}, \quad \text{for all } i, j, \text{ and } t \quad (8)$$

wherein;
T is the number of scheduling periods;
N is the number of simulations;
P is the total number of panels;
G is the number of all possible cutoff grades;
$R_i^n$ is the total rock in the panel i in simulations n,
$Q_{ij}^n$ is the total ore in the panel i, simulation n, when mined with the COG j;
$V_{ij}^n$ is the value of the panel i, simulation n, when mined and processed with the COG j;
$R_t^0$ is the maximum mining capacity in period t;
$Q_t^0$ is the maximum processing rate in period t;
$S_i$ is the set of panels that must be removed before starting the panel i;
$d^t$ is the time discount factor;
$x_{ijt}$ is the fraction of the panel i is extracted with the COG j in period t;
$y_{it}$ is a binary variable equal to 1 if the extraction of the panel i has started in periods 1 to t, and equal to 0 otherwise;
$\delta_{jt}$ a binary variable controlling the selection of the COG applied in period t.

20. The tangible computer readable medium of claim 19 wherein the code for creation of the plurality of different block models is code for performing a conditional simulation technique which provides the generation of a plurality of equally probable block model realisations, all of which honour the data and first and second order statistics of the resource represented, respectively, by probability distribution function and variogram.

21. The tangible computer readable medium of claim 19 wherein the program further comprises code for reducing the number of blocks in each of the block models by aggregating blocks prior to the step of scheduling extraction.

22. The tangible computer readable medium of claim 19 wherein the code for scheduling further comprises code for optimizing extraction by considering the average valuation produced from the conditional simulations.

23. The tangible computer readable medium of claim 19 wherein the code for scheduling further comprises code for using all of the conditional simulations to optimize simultaneously to produce the single extraction schedule with a variable cut-off grade policy, and wherein all the conditional simulations are valued using the single extraction schedule and the valuations are averaged to produce the expected net present value.

24. The tangible computer readable medium of claim 19 wherein the extraction schedule determines whether resource and medium corresponding to each block is sent for processing, sent to waste or stockpiled for later processing.

25. The tangible computer readable medium of claim 19 wherein the code for scheduling using a variable cut-off grade converts from a non-linear representation to a linear representation, and further comprises a mixed integer programming formulation is used for simultaneous optimisation of the extraction schedule and the cut-off grade.

26. A method of mining a mine comprising a resource within a medium, the method comprising:

removing medium and resource from the mine using an extraction schedule created by the following steps:

obtaining drillhole grade data relating to the resource contained within the medium;

creating with a processor a plurality of different block models of the mine, each formed of a plurality of blocks, each block in each model having a resource grade, each of the block models honouring the drillhole grade data; and scheduling with a processor, extraction of blocks based on a cut-off grade policy to increase expected net present value having regard to all of the plurality of different block models, wherein the extraction schedule is determined by the following:

$$\text{Maximise}\left(\frac{1}{N}\sum_{n=1}^{N}\sum_{i=1}^{P}\sum_{j=1}^{G}\sum_{t=1}^{T}V_{ij}^{n}x_{ijt}d^{t}\right) \quad (1)$$

subject to the following constraints:

$$\frac{1}{N}\sum_{n=1}^{N}\sum_{i=1}^{P}\sum_{j=1}^{G}R_{i}^{n}x_{ijt} \leq R_{t}^{0}, \quad \text{for all } t \quad (2)$$

$$\frac{1}{N}\sum_{n=1}^{N}\sum_{i=1}^{P}\sum_{j=1}^{G}Q_{ij}^{n}x_{ijt} \leq Q_{t}^{0}, \quad \text{for all } t \quad (3)$$

$$y_{i,t-1} \leq y_{it}, \quad \text{for all } i \text{ and } t \quad (4)$$

$$\sum_{\tau=1}^{t}\sum_{j=1}^{G}x_{ij\tau} \leq y_{it}, \quad \text{for all } i \quad (5)$$

$$y_{it} \leq \sum_{j=1}^{G}\sum_{t=1}^{T}x_{kj\tau}, \quad \text{for all } i, t \text{ and } k \subset S_{i} \quad (6)$$

$$\sum_{j=1}^{G}\delta_{jt} = 1, \quad \text{for all } t \quad (7)$$

$$x_{ijt} \leq \delta_{jt}, \quad \text{for all } i, j, \text{ and } t \quad (8)$$

wherein;
T is the number of scheduling periods;
N is the number of simulations;
P is the total number of panels;
G is the number of all possible cutoff grades;
$R_i^n$ is the total rock in the panel i in simulations n,
$Q_{ij}^n$ is the total ore in the panel i, simulation n, when mined with the COG j;
$V_{ij}^n$ is the value of the panel i, simulation n, when mined and processed with the COG j;
$R_t^0$ is the maximum mining capacity in period t;
$Q_t^0$ is the maximum processing rate in period t;
$S_i$ is the set of panels that must be removed before starting the panel i;
$d^t$ is the time discount factor;
$x_{ijt}$ is the fraction of the panel i is extracted with the COG j in period t;
$y_{it}$ is a binary variable equal to 1 if the extraction of the panel i has started in periods 1 to t, and equal to 0 otherwise;
$\delta_{jt}$ a binary variable controlling the selection of the COG applied in period t.

27. The method of claim 26 wherein the creation of the plurality of different block models is a conditional simulation technique which provides the generation of a plurality of equally probable block model realisations, all of which honour the data and first and second order statistics of the resource represented, respectively, by probability distribution function and variogram.

28. The method of claim 26 wherein the number of blocks in each of the block models is reduced by aggregating blocks prior to the step of scheduling extraction.

29. The method of claim 26 wherein the plurality of block models are used to provide an average of resource grade and block valuations and the average of the resource grade and block valuations is used to produce the scheduled extraction of blocks and the cut-off grade value to increase expected net present value.

30. The method of claim 26 wherein the scheduled extraction of blocks is optimised by considering the average valuation produced from the conditional simulations.

31. The method of claim 26 wherein all of the conditional simulations are optimized simultaneously to produce the extraction schedule with a variable cut-off grade policy, and wherein all the conditional simulations are valued using the extraction schedule and the valuations are averaged to produce the expected net present value.

32. The method of claim 26 wherein the extraction schedule determines whether resource and medium corresponding to each block is sent for processing, sent to waste or stockpiled for later processing.

33. The method of claim 26 wherein the step of scheduling using a variable cut-off grade is converted from a non-linear representation to a linear representation, and a mixed integer programming formulation is used for simultaneous optimisation of the extraction schedule and the cut-off grade.

34. A method of determining the net present value of a mine comprising a resource within a medium, the method comprising the steps of:
   obtaining drillhole grade data relating to the resource contained within the medium;
   creating a plurality of different block models of the mine with a processor, each formed of a plurality of blocks, each block in each model having a resource grade, each of the block models honouring the drillhole grade data; and
   generating a single schedule for extraction of blocks from the mine with a processor based on a cut-off grade policy to provide the net present value having regard to all of the plurality of different block models, wherein the single extraction schedule is determined by the following:

$$\text{Maximise}\left(\frac{1}{N}\sum_{n=1}^{N}\sum_{i=1}^{P}\sum_{j=1}^{G}\sum_{t=1}^{T}V_{ij}^{n}x_{ijt}d^{t}\right) \quad (1)$$

subject to the following constraints:

$$\frac{1}{N}\sum_{n=1}^{N}\sum_{i=1}^{P}\sum_{j=1}^{G}R_{i}^{n}x_{ijt} \leq R_{t}^{0}, \quad \text{for all } t \quad (2)$$

$$\frac{1}{N}\sum_{n=1}^{N}\sum_{i=1}^{P}\sum_{j=1}^{G}Q_{ij}^{n}x_{ijt} \leq Q_{t}^{0}, \quad \text{for all } t \quad (3)$$

$$y_{i,t-1} \leq y_{it}, \quad \text{for all } i \text{ and } t \quad (4)$$

$$\sum_{\tau=1}^{t}\sum_{j=1}^{G}x_{ij\tau} \leq y_{it}, \quad \text{for all } i \quad (5)$$

$$y_{it} \leq \sum_{j=1}^{G}\sum_{\tau=1}^{T}x_{kj\tau}, \quad \text{for all } i, t \text{ and } k \subset S_{i} \quad (6)$$

$$\sum_{j=1}^{G}\delta_{jt} = 1, \quad \text{for all } t \quad (7)$$

$$x_{ijt} \leq \delta_{jt}, \quad \text{for all } i, j, \text{ and } t \quad (8)$$

wherein;
T is the number of scheduling periods;
N is the number of simulations;
P is the total number of panels;
G is the number of all possible cutoff grades;
$R_i^n$ is the total rock in the panel i in simulations n,
$Q_{ij}^n$ is the total ore in the panel i, simulation n, when mined with the COG j;
$V_{ij}^n$ is the value of the panel i, simulation n, when mined and processed with the COG j;
$R_t^0$ is the maximum mining capacity in period t;
$Q_t^0$ is the maximum processing rate in period t;
$S_i$ is the set of panels that must be removed before starting the panel i;
$d^t$ is the time discount factor;
$x_{ijt}$ is the fraction of the panel i is extracted with the COG j in period t;
$y_{it}$ is a binary variable equal to 1 if the extraction of the panel i has started in periods 1 to t, and equal to 0 otherwise;
$\delta_{jt}$ is a binary variable controlling the selection of the COG applied in period t.

35. The method of claim 34 wherein the creation of the plurality of different block models is a conditional simulation technique which provides the generation of a plurality of equally probable block model realisations, all of which honour the data and first and second order statistics of the resource represented, respectively, by probability distribution function and variogram.

36. The method of claim 34 wherein the number of blocks in each of the block models is reduced by aggregating blocks prior to the step of scheduling extraction.

37. The method of claim 34 wherein the cut-off grade is a variable cut-off grade.

38. The method of claim 34 wherein the plurality of block models are used to provide an average of resource grade and block valuations and the average of the resource grade and block valuations is used to produce the scheduled extraction of blocks and the cut-off grade value to increase expected net present value.

39. The method of claim 34 wherein the scheduled extraction of blocks is optimised by considering the average valuation produced from the conditional simulations.

40. The method of claim 34 wherein all of the conditional simulations are optimized simultaneously to produce the single extraction schedule with a variable cut-off grade policy, and wherein all the conditional simulations are valued using the single extraction schedule and the valuations are averaged to produce the expected net present value.

41. The method of claim 34 wherein the extraction schedule determines whether resource and medium corresponding to each block is sent for processing, sent to waste or stockpiled for later processing.

42. The method of claim 34 wherein the step of scheduling using a variable cut-off grade is converted from a non-linear representation to a linear representation, and a mixed integer programming formulation is used for simultaneous optimisation of the extraction schedule and the cut-off grade.

43. A method for scheduling the extraction of a resource contained within a medium in a mine, comprising the steps of:
   obtaining drillhole grade data relating to the resource contained within the medium;
   creating a block model of the mine with a processor with each block in the model having a resource grade;
   generating a schedule for extraction of blocks from the mine with a processor based on a variable cut-off grade value to increase expected net present value, the variable cut-off grade being represented by a non-linear function; and
   converting the non-linear representation to a linear representation with the processor and using a mixed integer programming formulation for a simultaneous optimisation by the processor of an extraction sequence provided by the scheduled extraction and cut-off grade policy, wherein the extraction schedule is determined by the following:

$$\text{Maximise}\left(\frac{1}{N}\sum_{n=1}^{N}\sum_{i=1}^{P}\sum_{j=1}^{G}\sum_{t=1}^{T}V_{ij}^{n}x_{ijt}d^{t}\right) \quad (1)$$

subject to the following constraints:

$$\frac{1}{N}\sum_{n=1}^{N}\sum_{i=1}^{P}\sum_{j=1}^{G}R_{i}^{n}x_{ijt} \leq R_{t}^{0}, \text{ for all } t \quad (2)$$

$$\frac{1}{N}\sum_{n=1}^{N}\sum_{i=1}^{P}\sum_{j=1}^{G}Q_{ij}^{n}x_{ijt} \leq Q_{t}^{0}, \text{ for all } t \quad (3)$$

$$y_{i,t-1} \leq y_{it}, \text{ for all } i \text{ and } t \quad (4)$$

$$\sum_{\tau=1}^{t}\sum_{j=1}^{G}x_{ij\tau} \leq y_{it}, \text{ for all } i \quad (5)$$

$$y_{it} \leq \sum_{j=1}^{G}\sum_{t=1}^{T}x_{kj\tau}, \text{ for all } i, t \text{ and } k \subset S_i \quad (6)$$

$$\sum_{j=1}^{G}\delta_{jt} = 1, \text{ for all } t \quad (7)$$

$$x_{ijt} \leq \delta_{jt}, \text{ for all } i, j, \text{ and } t \quad (8)$$

wherein;
T is the number of scheduling periods;
N is the number of simulations;
P is the total number of panels;
G is the number of all possible cutoff grades;
$R_i^n$ is the total rock in the panel i in simulations n,
$Q_{ij}^n$ is the total ore in the panel i, simulation n, when mined with the COG j;
$V_{ij}^n$ is the value of the panel i, simulation n, when mined and processed with the COG j;
$R_t^0$ is the maximum mining capacity in period t;
$Q_t^0$ is the maximum processing rate in period t;
$S_i$ is the set of panels that must be removed before starting the panel i;
$d^t$ is the time discount factor;
$x_{ijt}$ is the fraction of the panel i is extracted with the COG j in period t;
$y_{it}$ is a binary variable equal to 1 if the extraction of the panel i has started in periods 1 to t, and equal to 0 otherwise;
$\delta_{jt}$ is a binary variable controlling the selection of the COG applied in period t.

44. The method of claim 43 wherein the non-linear function is converted to a plurality of linear values by producing a plurality of step values relating to the non-linear function, and selecting one of the values to provide the cut-off grade decision by the mixed integer programming function.

45. The method of claim 43 wherein the block model is a deterministic model built by spatial interpretation of the data using a Kriging procedure.

46. The method of claim 43 wherein the block model is a conditional simulation producing a plurality of different block models providing a number of equally probably realisations of block models honouring the drillhole data and first and second order statistics of the resource distributed in the medium represented, respectively, by probability distribution and variogram.

47. The method of claim 43 wherein the number of blocks in each of the block models is reduced by aggregating blocks prior to the step of scheduling extraction.

48. The method of claim 43 wherein the plurality of block models are used to provide an average of resource grade valuations and the average of the resource grade valuations is used to produce the scheduled extraction of blocks and the cut-off grade value to increase expected net present value.

49. The method of claim 43 wherein the scheduled extraction of blocks is optimised by considering the average valuation produced from the conditional simulations.

50. The method of claim 43 wherein all of the conditional simulations are optimised to produce a plurality of extraction schedules, each having valuations and the valuations are averaged to produce the net present value, and the extraction schedule comprises the extraction schedule which is closest to that giving the net present value.

51. The method of claim 43 wherein the extraction schedule determines whether resource and medium corresponding to each block is sent for processing, sent to waste or stockpiled for later processing.

52. An apparatus for scheduling the extraction of a resource contained within a medium in a mine, comprising:
 a processor for receiving drillhole grade data relating to the resource contained within the medium;
 a processor for creating a block model with each block in the model having a resource grade;
 a processor for scheduling extraction of blocks from the mine based on a variable cut-off grade value to increase expected net present value, the variable cut-off grade being represented by a non-linear function; and
 a processor for converting the non-linear representation to a linear representation and using a mixed integer programming formulation for a simultaneous optimisation of an extraction sequence provided by the scheduled extraction and cut-off grade policy, wherein the extraction schedule is determined by the following:

$$\text{Maximise}\left(\frac{1}{N}\sum_{n=1}^{N}\sum_{i=1}^{P}\sum_{j=1}^{G}\sum_{t=1}^{T}V_{ij}^{n}x_{ijt}d^{t}\right) \quad (1)$$

subject to the following constraints:

$$\frac{1}{N}\sum_{n=1}^{N}\sum_{i=1}^{P}\sum_{j=1}^{G}R_{i}^{n}x_{ijt} \leq R_{t}^{0}, \text{ for all } t \quad (2)$$

$$\frac{1}{N}\sum_{n=1}^{N}\sum_{i=1}^{P}\sum_{j=1}^{G}Q_{ij}^{n}x_{ijt} \leq Q_{t}^{0}, \text{ for all } t \quad (3)$$

$$y_{i,t-1} \leq y_{it}, \text{ for all } i \text{ and } t \quad (4)$$

$$\sum_{\tau=1}^{t}\sum_{j=1}^{G}x_{ij\tau} \leq y_{it}, \text{ for all } i \quad (5)$$

$$y_{it} \leq \sum_{j=1}^{G}\sum_{t=1}^{T}x_{kj\tau}, \text{ for all } i, t \text{ and } k \subset S_i \quad (6)$$

$$\sum_{j=1}^{G}\delta_{jt} = 1, \text{ for all } t \quad (7)$$

$$x_{ijt} \leq \delta_{jt}, \text{ for all } i, j, \text{ and } t \quad (8)$$

wherein;
T is the number of scheduling periods;
N is the number of simulations;

P is the total number of panels;
G is the number of all possible cutoff grades;
$R_i^n$ is the total rock in the panel i in simulations n,
$Q_{ij}^n$ is the total ore in the panel i, simulation n, when mined with the COG j;
$V_{ij}^n$ is the value of the panel i, simulation n, when mined and processed with the COG j;
$R_t^0$ is the maximum mining capacity in period t;
$Q_t^0$ is the maximum processing rate in period t;
$S_i$ is the set of panels that must be removed before starting the panel i;
$d^t$ is the time discount factor;
$x_{ijt}$ is the fraction of the panel i is extracted with the COG j in period t;
$y_{it}$ is a binary variable equal to 1 if the extraction of the panel i has started in periods 1 to t, and equal to 0 otherwise;
$\delta_{jt}$ is a binary variable controlling the selection of the COG applied in period t.

53. The apparatus of claim 52 wherein the processor is for converting the non-linear function to a plurality of linear values by producing a plurality of step values relating to the non-linear function, and selecting one of the values to provide the cut-off grade decision by the mixed integer programming function.

54. The apparatus of claim 52 wherein the block model is a deterministic model built by spatial interpretation of the data using a Kriging procedure.

55. The apparatus of claim 52 wherein the block model is a conditional simulation producing a plurality of different block models providing a number of equally probably realisations of block models honouring the drillhole data and first and second order statistics of the resource distributed in the medium represented, respectively, by probability distribution and variogram.

56. The apparatus of claim 52 wherein the number of blocks in each of the block models is reduced by aggregating blocks prior to the step of scheduling extraction.

57. The apparatus of claim 52 wherein the processor is for averaging of resource grade valuations from the block models and the average of the resource grade valuations is used to produce the scheduled extraction of blocks and the cut-off grade value to increase expected net present value.

58. The apparatus of claim 52 wherein the scheduled extraction of blocks is optimised by considering the average valuation produced from the conditional simulations.

59. The apparatus of claim 52 wherein the processor is for optimizing all of the conditional simulations to produce a plurality of extraction schedules, each having valuations and the valuations are averaged to produce the net present value, and the extraction schedule comprises one of a plurality of the extraction schedules which is closest to that giving the net present value.

60. The apparatus of claim 52 wherein the extraction schedule determines whether resource and medium corresponding to each block is sent for processing, sent to waste or stockpiled for later processing.

61. A tangible computer readable medium comprising a computer program for scheduling the extraction of a resource contained within a medium in a mine, comprising:
  code which when executed by a processor receives drillhole grade data relating to the resource contained within the medium;
  code which when executed by a processor creates a block model with each block in the model having a resource grade;
  code which when executed by a processor schedules extraction of blocks based on a variable cut-off grade value to increase expected net present value, the variable cut-off grade being represented by a non-linear function; and
  code which when executed by a processor converts the non-linear representation to a linear representation and using a mixed integer programming formulation for a simultaneous optimisation of an extraction sequence provided by the scheduled extraction and cut-off grade policy, wherein the extraction schedule is determined by the following:

$$\text{Maximise}\left(\frac{1}{N}\sum_{n=1}^{N}\sum_{i=1}^{P}\sum_{j=1}^{G}\sum_{t=1}^{T} V_{ij}^n x_{ijt} d^t\right) \quad (1)$$

subject to the following constraints:

$$\frac{1}{N}\sum_{n=1}^{N}\sum_{i=1}^{P}\sum_{j=1}^{G} R_i^n x_{ijt} \leq R_t^0, \text{ for all } t \quad (2)$$

$$\frac{1}{N}\sum_{n=1}^{N}\sum_{i=1}^{P}\sum_{j=1}^{G} Q_{ij}^n x_{ijt} \leq Q_t^0, \text{ for all } t \quad (3)$$

$$y_{i,t-1} \leq y_{it}, \text{ for all } i \text{ and } t \quad (4)$$

$$\sum_{\tau=1}^{t}\sum_{j=1}^{G} x_{ij\tau} \leq y_{it}, \text{ for all } i \quad (5)$$

$$y_{it} \leq \sum_{j=1}^{G}\sum_{\tau=1}^{T} x_{kj\tau}, \text{ for all } i, t \text{ and } k \subset Si \quad (6)$$

$$\sum_{j=1}^{G} \delta_{jt} = 1, \text{ for all } t \quad (7)$$

$$x_{ijt} \leq \delta_{jt}, \text{ for all } i, j, \text{ and } t \quad (8)$$

wherein;
T is the number of scheduling periods;
N is the number of simulations;
P is the total number of panels;
G is the number of all possible cutoff grades;
$R_i^n$ is the total rock in the panel i in simulations n,
$Q_{ij}^n$ is the total ore in the panel i, simulation n, when mined with the COG j;
$V_{ij}^n$ is the value of the panel i, simulation n, when mined and processed with the COG j;
$R_t^0$ is the maximum mining capacity in period t;
$Q_t^0$ is the maximum processing rate in period t;
$S_i$ is the set of panels that must be removed before starting the panel i;
$d^t$ is the time discount factor;
$x_{ijt}$ is the fraction of the panel i is extracted with the COG j in period t;
$y_{it}$ is a binary variable equal to 1 if the extraction of the panel i has started in periods 1 to t, and equal to 0 otherwise;
$\delta_{jt}$ is a binary variable controlling the selection of the COG applied in period t.

62. The tangible computer readable medium of claim 61 wherein the non-linear function is converted to a plurality of linear values by producing a plurality of step values relating to the non-linear function, and selecting one of the values to provide the cut-off grade decision by the mixed integer programming function.

63. The tangible computer readable medium of claim 61 wherein the block model is a deterministic model built by spatial interpretation of the data using a Kriging procedure.

64. The tangible computer readable medium of claim 61 wherein the block model is a conditional simulation producing a plurality of different block models providing a number of equally probably realisations of block models honouring the drillhole data and first and second order statistics of the resource distributed in the medium represented, respectively, by probability distribution and variogram.

65. The tangible computer readable medium of claim 61 wherein the number of blocks in each of the block models is reduced by aggregating blocks prior to the step of scheduling extraction.

66. The tangible computer readable medium of claim 61 wherein the plurality of block models are used to provide an average of resource grade valuations and the average of the resource grade valuations is used to produce the scheduled extraction of blocks and the cut-off grade value to increase expected net present value.

67. The tangible computer readable medium of claim 61 wherein the scheduled extraction of blocks is optimised by considering the average valuation produced from the conditional simulations.

68. The tangible computer readable medium of claim 61 wherein all of the conditional simulations are optimised to produce a plurality of extraction schedules, each of the plurality of extraction schedules having a valuation; wherein the valuations are averaged to produce the net present value, wherein the determined extraction schedule comprises one of the plurality of the extraction schedules which has the valuation closest to the net present value.

69. The tangible computer readable medium of claim 61 wherein the extraction schedule determines whether resource and medium corresponding to each block is sent for processing, sent to waste or stockpiled for later processing.

* * * * *

UNITED STATES PATENT AND TRADEMARK OFFICE
CERTIFICATE OF CORRECTION

| | |
|---|---|
| PATENT NO. | : 8,082,167 B2 |
| APPLICATION NO. | : 11/610617 |
| DATED | : December 20, 2011 |
| INVENTOR(S) | : Merab Menabde |

It is certified that error appears in the above-identified patent and that said Letters Patent is hereby corrected as shown below:

In column 25, claim 10, about line 22, before "a binary variable controlling the selection" insert --is--.

In column 26, claim 19, about line 66, before "a binary variable controlling the selection" insert --is--.

Signed and Sealed this
Seventeenth Day of April, 2012

David J. Kappos
*Director of the United States Patent and Trademark Office*